(12) United States Patent
Tamura et al.

(10) Patent No.: US 11,510,139 B2
(45) Date of Patent: Nov. 22, 2022

(54) AMF NODE AND METHOD THEREOF

(71) Applicant: NEC Corporation, Tokyo (JP)

(72) Inventors: Toshiyuki Tamura, Tokyo (JP);
Tsuyoshi Takakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/628,299

(22) PCT Filed: Dec. 18, 2020

(86) PCT No.: PCT/JP2020/047463
§ 371 (c)(1),
(2) Date: Jan. 19, 2022

(87) PCT Pub. No.: WO2021/132087
PCT Pub. Date: Jul. 1, 2021

(65) Prior Publication Data
US 2022/0256448 A1 Aug. 11, 2022

(30) Foreign Application Priority Data

Dec. 26, 2019 (JP) .............................. JP2019-237390

(51) Int. Cl.
*H04W 48/18* (2009.01)
*H04W 48/02* (2009.01)
*H04W 12/06* (2021.01)

(52) U.S. Cl.
CPC ........... *H04W 48/18* (2013.01); *H04W 12/06* (2013.01); *H04W 48/02* (2013.01)

(58) Field of Classification Search
CPC ...... H04W 48/18; H04W 12/06; H04W 48/02
See application file for complete search history.

(56) References Cited

U.S. PATENT DOCUMENTS

2018/0227873 A1 8/2018 Vrzic et al.
2019/0098537 A1 3/2019 Qiao et al.
(Continued)

FOREIGN PATENT DOCUMENTS

CN 109314917 A 2/2019
CN 110506439 A 11/2019
(Continued)

OTHER PUBLICATIONS

3GPP TSG-CT WG1 Meeting #121 Introduction of pending NSSAI for network slice-specific authentication and authorization [online ], 3GPPTSGCTWGI4121CL199044, Internet<URD:hitps://www3gpp.org/fip/isgct/WGI_mmni-ce-sm_ex-CN1/TSGCL121Reno/Docs/C1-199044.zip>, Nov. 15, 2019, pp. 1-10. (Year: 2019).*

(Continued)

*Primary Examiner* — Brandon J Miller
(74) *Attorney, Agent, or Firm* — Sughrue Mion, PLLC

(57) ABSTRACT

An AMF node (2) manages a UE context regarding a UE (1). The UE context includes a) a set of allowed network slice identifiers indicating one or more network slice identifiers currently allowed to the UE (1), and b) a set of pending network slice identifiers indicating one or more network slice identifiers for which a Network Slice-Specific Authentication and Authorization (NSSAA) procedure is pending. If the AMF (2) triggers initiation of a re-authentication and re-authorization procedure for a first network slice identifier currently allowed to the UE (1), it removes the first network slice identifier from the allowed set and store the same in the pending set. This, for example, allows the AMF to manage the UE context appropriately.

20 Claims, 13 Drawing Sheets

(56) References Cited

U.S. PATENT DOCUMENTS

2020/0162919 A1* 5/2020 Velev ............ H04W 12/084
2020/0267554 A1* 8/2020 Faccin ............ H04L 63/101

FOREIGN PATENT DOCUMENTS

WO    2018/141269    8/2018
WO    2021/236913    11/2021

OTHER PUBLICATIONS

3GPP TSG-SA3 Meeting #97 Draft for network slice specific authentication procedures [online], 3GPPTSGSAWG3#97S3-194541, Internet<URL:https://www3epp.org/fip/isgsa/WG3_Security/TSGS3_97Reno/Docs/S3-194541 zip>, Oct. 14, 2019, pp. 1-9. (Year: 2019).*

English translation of Written opinion for PC: Application No. PCT/JP2020/047463, dated Mar. 9, 2021.

3GPP TS 23.501 V16.2.0 (Sep. 2019) "System Architecture for the 5G System (5GS); Stage 2(Release 16)", Sep. 2019.

3GPP TS 23.502 V16.2.0 (Sep. 2019) "Procedures for the 5G System (5GS); Stage 2 (Release 16)", Sep. 2019.

3GPP TS 24.501 VI6.2.0 (Sep. 2019) "Non-Access-Stratum (NAS) protocol for 5G System (5GS); Stage 3 (Release 16)", Sep. 2019.

InterDigital, ZTE, vivo, NEC, "Introduction of pending NSSAI for network slice-specific authentication and authorization", C1-199044, 3GPP TSG-CT WG1 Meeting #121, Nov. 11-15, 2019.

China Mobile, Nokia, Ericsson, Telecom Italia, "Service used for slice-specific re-authentication and revocation", S2-1912488, 3GPP TSG-SA WG2 Meeting #136, Nov. 18-22, 2019.

Nokia, Nokia Shanghai Bell, Ericsson, Huawei, Hisilicon, Interdigital, Draft for network slice specific authentication procedures, 3GPP TSG SA WG3 #97 S3-194541, Oct. 14, 2019.

Extended European Search Report for EP Application No. EP20904839.6 dated Aug. 30, 2022.

Interdigital. "Introduction of pending NSSAI for network slice-specific authentication and authorization". 3GPP TSG-CT1 Meeting #120, C1-196089, Oct. 7-11, 2019.

3GPP TS 24.501 V16.3.0 (Dec. 20, 2019).

3GPP TS 23.502 V16.3.0 (Dec. 22, 2019).

NEC, "NSSAI storage at UE—pending NSSAI", 3GPP TSG-CT WG1 Meeting #122-e, C1-200694, Feb. 20-28, 2020

3GPP TS 24.501 V16.6.0 (Sep. 25, 2020).

3GPP TS 23.501 V16.4.0 (Mar. 2020), 3GPP Draft; 23501—G40_WAITING_23501_CR2179_CRS_IMPLEMENTED_CR2195FIX_R2, Mar. 20, 2020.

Chinese Office Communication for CN Application No. 202080054992.X dated Jun. 21, 2022 with English Translation,.

* cited by examiner

AMF NODE AND METHOD THEREOF

This application is a National Stage Entry of PCT/JP2020/047463 filed on Dec. 18, 2020, which claims priority from Japanese Patent Application 2019-237390 filed on Dec. 26, 2019, the contents of all of which are incorporated herein by reference, in their entirety.

TECHNICAL FIELD

The present disclosure relates to cellular networks, and in particular to management of network slices allowed to radio terminals.

BACKGROUND ART

The 5G system (5GS) supports network slicing (see, for example, Non-Patent Literature 1 to 3, especially Section 5.15 of Non-Patent Literature 1). Network slicing use Network Function Virtualization (NFV) and software-defined networking (SDN) technologies, thereby creating multiple virtualized logical networks on top of physical networks. Each virtualized logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (at least one of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra Reliable and Low Latency Communication (URLLC), Massive Internet of Things (MIoT), and Vehicle to Everything (V2X) slice types. A non-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI ensures network isolation by selecting a particular NSI. A NSI may be selected via different S-NSSAIs. An S-NSSAI may be associated with different NSIs. A network slice may be uniquely identified by an S-NSSAI.

There are two types of S-NSSAI, known as S-NSSAI and Mapped S-NSSAI. An S-NSSAI identifies a network slice served by a Public Land Mobile Network (PLMN) in which a UE is registered. A Mapped S-NSSAI may be an S-NSSAI of a Home PLMN (HPLMN) that is mapped to (associated with, or applicable to) an S-NSSAI that identifies a network slice of a roaming network when a UE is roaming, and also an S-NSSAI that is included in the subscription information of the UE. Thereafter, S-NSSAI and Mapped S-NSSAI may be collectively referred to as simply S-NSSAI in this specification.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NNSAIs each applicable to one or more PLMNs. For example, The Configured NSSAI is configured by a Serving PLMN and is applied to the Serving PLMN. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

A Requested NSSAI is signaled by a UE to a network in, for example, a registration procedure, allowing the network to determine a serving AMF, at least one network slice and at least one NSIs, for this UE.

An allowed NSSAI is provided to a UE by a Serving PLMN and indicates one or more S-NSSAIs that the UE can use in the current Registration Area of the Serving PLMN. The Allowed NSSAI is determined by an AMF of the Serving PLMN, for example, during a registration procedure. Accordingly, the Allowed NSSAI is signaled to the UE by the network (i.e., AMF) and stored in (non-volatile) memories of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area. If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in (non-volatile) memories of both the AMF and the UE.

A Pending NSSAI is newly agreed upon in the 3rd Generation Partnership Project (3GPP) (see Non-Patent Literature 4). A Pending NSSAI indicates one or more S-NSSAIs for which Network Slice-Specific Authentication and Authorization (NSSAA)) is pending. A Serving PLMN shall perform NSSAA for S-NSSAIs of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAIs subject to NSSAA in the Allowed NSSAI, but instead them in the Pending NSSAI. The Pending NSSAI is signaled to the UE by the network (i.e., AMF) and stored in (non-volatile) memories of both the AMF and the UE.

An AMF manages a UE context for a UE in Registration Management (RM)-REGISTERED state. The UE context may be referred to as, but is not limited to, a Mobility Management (MM) context. The UE context may include one or more of the Allowed NSSAI, Rejected NSSAI, and Pending NSSAI described above. On the other hand, the UE manages a UE NSSAI configuration, which includes the Configured NSSAI, Allowed NSSAI, Rejected NSSAI, and Pending NSSAI described above. The UE NSSAI configuration is stored in a non-volatile memory in the UE (Mobile Equipment (ME) except Universal Subscriber Identity Module (USIM)). The memory or memory area where the UE NSSAI configuration is stored is referred to as NSSAI storage.

Section 5.15.10 of Non-Patent Literature 1 (3GPP TS 23.501) and Section 4.2.9 of Non-Patent Literature 2 (3GPP TS 23.502) specify the Network Slice-Specific Authentication and Authorization (NSSAA). More specifically, section 5.15.10 of Non-Patent Literature 1 and section 4.2.9.2 of Non-Patent Literature 2 describe the NSSAA. Section 5.15.10 of Non-Patent Literature 1 and Section 4.2.9.3 of Non-Patent Literature 2 describe the re-authentication and re-authorization triggered by an Authentication, Authorization and Accounting (AAA) server (AAA-S). Section 5.15.10 of Non-Patent Literature 1 and Section 4.2.9.4 of Non-Patent Literature 2 describe the revocation of Slice-Specific Authorization triggered by an AAA server. In addition, Non-Patent Literature 5 describes a proposed amendment to the revocation of Slice-Specific Authorization as specified in section 4.2.9.4 of Non-Patent Literature 2.

CITATION LIST

Non Patent Literature

[Non-Patent Literature 1] 3GPP TS 23.501 V16.2.0 (2019-09) "3rd Generation Partnership Project; Technical Specification Group Services and System Aspects; System Architecture for the 5G System (5GS); Stage 2(Release 16)", September 2019

[Non-Patent Literature 2] 3GPP TS 23.502 V16.2.0 (2019-09) "3rd Generation Partnership Project; Technical Specification Group Services and System Aspects; Procedures for the 5G System (5GS); Stage 2 (Release 16)", September 2019

[Non-Patent Literature 3] 3GPP TS 24.501 V16.2.0 (2019-09) "3rd Generation Partnership Project; Technical Specification Group Core Network and Terminals; Non-Access-Stratum (NAS) protocol for 5G System (5GS); Stage 3 (Release 16)", September 2019

[Non-Patent Literature 4] InterDigital, ZTE, vivo, NEC, "Introduction of pending NSSAI for network slice-specific authentication and authorization", C1-199044, 3GPP TSG-CT WG1 Meeting #121, Reno (NV), USA, 11-15 Nov. 2019

[Non-Patent Literature 5] China Mobile, Nokia, Ericsson, Telecom Italia, "Service used for slice-specific re-authentication and revocation", S2-1912488, 3GPP TSG-SA WG2 Meeting #136, Reno Nev., USA, 18-22 Nov. 2019

SUMMARY OF INVENTION

Technical Problem

The AMF may perform Network Slice-Specific Authentication and Authorization (NSSAA) again on one or more currently allowed S-NSSAIs of the UE(See, for example, section 4.2.9 of Non-Patent Literature 2). More specifically, if the Authentication, Authorization and Accounting (AAA) server triggers re-authentication of one or more currently allowed S-NSSAIs, then the AMF triggers the initiation of NSSAA for these S-NSSAIs. In addition, the AMF may determine, based on changes in the UE's subscription information, that reauthentication is required for one or more currently allowed S-NSSAIs of that UE. Furthermore, when the AMF receives a Registration Request message for Mobility Registration Update or Periodic Registration Update from the UE, it may determine, for example based on operator policy, that re-authentication is required for one or more currently allowed S-NSSAIs. In addition, as well as these conditions, the AMF may determine that re-authentication is required for one or more currently allowed S-NSSAIs, for example based on operator policy. In these cases, the AMF triggers the initiation of NSSAA for S-NSSAIs that need to be reauthenticated.

However, in the case of triggering the initiation of a re-authentication and re-authorization procedure (i.e., NSSAA) for a particular currently allowed S-NSSAI for a UE, it is not clear how an AMF should deal with the UE context managed by that AMF. More specifically, it is not clear whether the AMF should (a) continue to store this particular S-NSSAI in the Allowed NSSAI of the UE context for that UE.

One of the objects to be attained by embodiments disclosed herein is to provide apparatuses, methods, and programs that contribute to allowing an AMF to appropriately manage a UE context when the AMF triggers the initiation of a re-authentication and re-authorization procedure for a particular network slice identifier (e.g., S-NSSAI) currently allowed to a UE. It should be noted that this object is merely one of the objects to be attained by the embodiments disclosed herein. Other objects or problems and novel features will be made apparent from the following description and the accompanying drawings.

Solution to Problem

In a first aspect, an AMF includes at least one memory and at least one processor coupled to the at least one memory. The at least one processor is configured to manage a UE context regarding a UE. The UE context includes a) a set of allowed network slice identifiers indicating one or more network slice identifiers currently allowed to the UE, and b) a set of pending network slice identifiers indicating one or more network slice identifiers for which a Network Slice-Specific Authentication and Authorization (NSSAA) procedure is pending. The at least one processor is further configured to, in a case where the at least one processor triggers initiation of a re-authentication and re-authorization procedure for a first network slice identifier currently allowed to the UE, remove the first network slice identifier from the set of allowed network slice identifiers, and store the first network slice identifier in the set of pending network slice identifiers.

In a second aspect, a method in an AMF includes the following steps:

(a) managing a User Equipment (UE) context regarding a UE, wherein the UE context includes a) a set of allowed network slice identifiers indicating at least one network slice identifier currently allowed to the UE, and b) a set of pending network slice identifiers indicating at least one network slice identifier for which a Network Slice-Specific Authentication and Authorization (NSSAA) procedure is pending; and (b) in a case where the AMF triggers initiation of a re-authentication and re-authorization procedure for a first network slice identifier currently allowed to the UE, removing the first network slice identifier from the set of allowed network slice identifiers, and storing the first network slice identifier in the set of pending network slice identifiers.

In a third aspect, an AMF includes at least one memory and at least one processor coupled to the at least one memory. The at least one processor is configured to manage a UE context regarding a UE. The UE context includes a) a set of allowed network slice identifiers indicating one or more network slice identifiers currently allowed to the UE, and b) a set of pending network slice identifiers indicating one or more network slice identifiers for which a Network Slice-Specific Authentication and Authorization (NSSAA) procedure is pending. The at least one processor is further configured to, in a case where the at least one processor triggers initiation of a re-authentication and re-authorization procedure for a first network slice identifier currently allowed to the UE, continue to store the first network slice identifier in the set of allowed network slice identifiers.

In a fourth aspect, a method in an AMF includes the following steps:
(a) managing a User Equipment (UE) context regarding a UE, wherein the UE context includes a) a set of allowed network slice identifiers indicating at least one network slice identifier currently allowed to the UE, and b) a set of pending network slice identifiers indicating at least one network slice identifier for which a Network Slice-Specific Authentication and Authorization (NSSAA) procedure is pending; and
(b) in a case where the AMF triggers initiation of a re-authentication and re-authorization procedure for a first network slice identifier currently allowed to the UE, continuing to store the first network slice identifier in the set of allowed network slice identifiers.

In a fifth aspect, a program includes instructions (software codes) that, when loaded into a computer, cause the computer to perform the method according to the above-described second or fourth aspect.

Advantageous Effects of Invention

According to the above-described aspects, it is possible to provide apparatuses, methods, and programs that contribute to allowing an AMF to appropriately manage a UE context when the AMF triggers the initiation of a re-authentication and re-authorization procedure for a particular network slice identifier (e.g., S-NSSAI) currently allowed to a UE.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3rd Generation Partnership Project (3GPP) fifth generation mobile communication system (5G system (5GS)). However, these embodiments may be applied to other cellular communication systems that support network slicing similar to that of the 5GS.

First Embodiment

Figure 1:
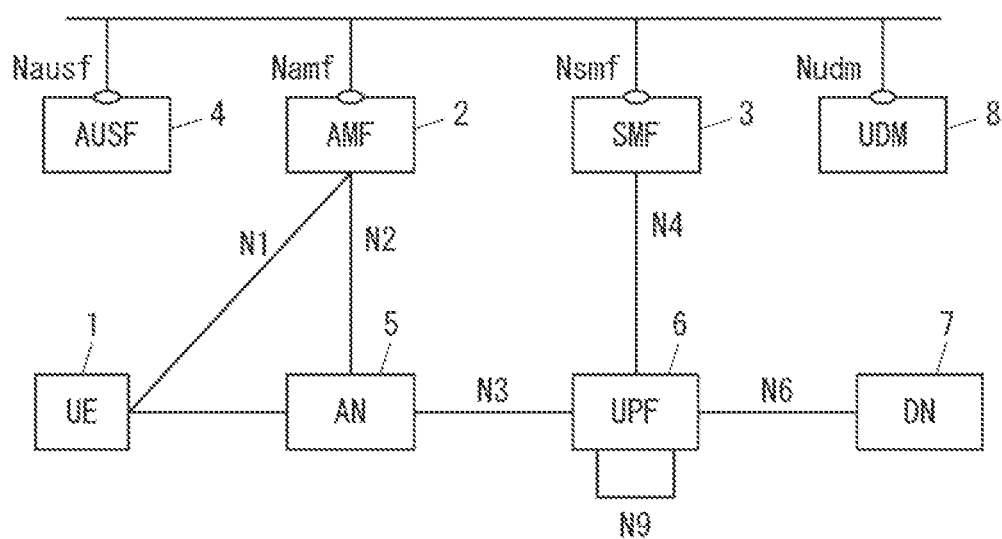
FIG. 1 is a diagram showing a configuration example of a cellular network according to an embodiment.

FIG. 1 shows a configuration example of a cellular network (i.e., 5GS) according to the present embodiment. Each of the elements shown in FIG. 1 is a network function and provides an interface as defined by the 3rd Generation Partnership Project (3GPP). Each of the elements (network functions) shown in FIG. 1 can be implemented, for example, as a network element on dedicated hardware, as a software instance running on dedicated hardware, or as a virtual function instantiated on an application platform.

The cellular network shown in FIG. 1 may be provided by a Mobile Network Operator (MNO), or it may be a Non-Public Network (NPN) provided by a non-MNO. If the cellular network shown in FIG. 1 is an NPN, it may be an independent network, represented as a Stand-alone Non-Public Network (SNPN), or it may be an NPN linked to an MNO network, represented as a public network integrated NPN.

A radio terminal (i.e., UE) 1 uses 5G connectivity services and communicates with a data network (DN) 7. More specifically, the UE 1 is connected to an access network (i.e., 5G Access Network (SGAN)) 5 and communicates with the DN 7 via a User Plane Function (UPF) 6 in a core network (i.e., 5G core network (5GC)). The AN 5 may include a Next Generation Radio Access Network (NG-RAN) or a non-3GPP AN, or both. The non-3GPP AN may be a network that handles wireless LAN (WiFi) communications or a network that handles wired communications, referred to as a Wireline 5G Access Network (W-SGAN). The UPF 6 may include multiple UPFs that are interconnected.

In the 5G architecture, the connectivity service between the UE 1 and the DN 7 is supported by one or more Protocol Data Unit (PDU) sessions. A PDU session is an association, session, or connection between the UE 1 and the DN7. A PDU session is used to provide a PDU connectivity service (i.e., an exchange of PDUs between the UE 1 and the DN 7). The UE 1 establishes one or more PDU sessions between the UE 1 and the UPF 6 (i.e., the PDU session anchor) to which the DN 7 is connected. In terms of data transfer, a PDU session consists of a tunnel (N9 tunnel) in the 5GC, a tunnel (N3 tunnel) between the 5GC and the AN 5 and one or more radio bearers. Although not shown in FIG. 1, the UE 1 may establish multiple PDU sessions with multiple UPFs (PDU session anchors) 6 in order to concurrently access multiple DNs 7.

The AMF 2 is one of the network functions in the 5GC Control Plane. The AMF 2 provides the termination of a RAN Control Plane (CP) interface (i.e., N2 interface). The AMF 2 terminates a single signalling connection (i.e., N1 NAS signalling connection) with the UE 1 and provides registration management, connection management, and mobility management. The AMF 2 provides NF services to NF consumers (e.g., other AMFs, Session Management Function (SMF) 3, and Authentication Server Function (AUSF) 4) on a service-based interface (i.e., Namf interface). The NF services provided by the AMF 2 include a communication service (Namf_Communication). The communication service allows NF consumers (e.g., SMF 3) to communicate with the UE 1 or AN 5 via the AMF 2.

The SMF 3 is one of the network functions in the 5GC Control Plane. The SMF 3 manages PDU sessions. The SMF 3 sends and receives SM signalling messages (NAS-SM messages, N1 SM messages) to and from the Non-Access-Stratum (NAS) Session Management (SM) layer of the UE 1 via communication services provided by the AMF 2. The SMF 3 provides NF services on a service-based interface (i.e., Nsmf interface) to NF consumers (e.g., AMF 2, other SMFs). The NF services provided by the SMF 3 include a PDU session management service (Nsmf_PDUSession), which allows the NF consumer (e.g., AMF 2) to handle PDU sessions. The SMF 3 may be an Intermediate SMF (I-SMF). The I-SMF is inserted between the AMF 2 and an original SMF 3 as needed when the UPF 6 belongs to a different SMF service area and cannot be controlled by the original SMF.

The AUSF 4 is one of the network functions in the 5GC Control Plane. The AUSF 4 provides NF services on a service based interface (i.e., Nausf interface) to NF consumers (e.g., AMF 2, UDM 8). The NF services provided by the AUSF 4 include a UE authentication service (e.g., Nausf_UEAuthentication and Nausf_NSSAA_Authenticate). The Nausf_UEAuthentication service provides UE authentication and related key information (keying material) to the NF consumer (i.e., AMF). More specifically, the AUSF 4 cooperates with the UDM 8 and Authentication credential Repository and Processing Function (ARPF) to perform authentication using one of the two authentication methods (i.e., 5G-Authentication and Key Agreement (AKA) and EAP-based authentication) supported by the 5GS. After performing the authentication, the AUSF 4 replies to the AMF 2 with the authentication result and, if successful, a master key. The master key is used by the AMF 2 to derive NAS security keys and other security key(s). For UE authentication, the AUSF 4 works closely with the UDM 8. The Nausf_NSSAA_Authenticate service provides the NF consumer (e.g., AMF 2) with a Network Slice-Specific Authentication and Authorization service between the UE 1 and an AAA server via the AUSF 4.

The UDM 8 is one of the network functions in the 5GC Control Plane. The UDM 8 provides access to a database (i.e., User Data Repository (UDR)) storing subscriber data (subscription information). The UDM 8 provides NF services on a service-based interface (i.e., Nudm interface) to NF consumers (e.g., AMF 2, AUSF 4, SMF 3). The NF services provided by the UDM 8 include a subscriber data management service, which allows the NF consumer (e.g., AMF) to retrieve subscriber data and provides updated subscriber data to the NF consumer.

The configuration example in FIG. 1 shows only typical NFs for convenience of explanation. The cellular network according to this embodiment may include other NFs not shown in FIG. 1, such as Network Slice Selection Function (NSSF) and Policy Control Function (PCF).

Figure 2:
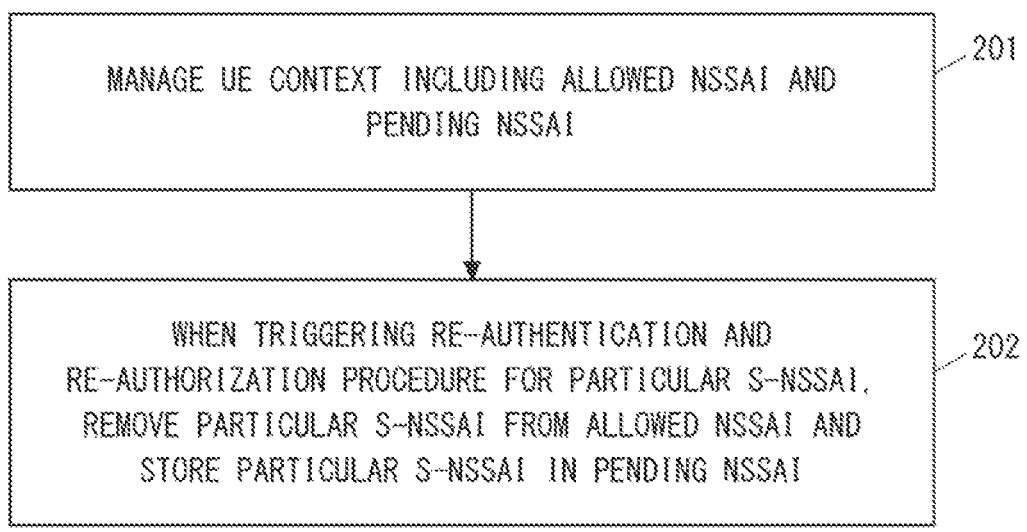
FIG. 2 is a flowchart showing an example of operation of an AMF according to an embodiment.

FIG. 2 is a flowchart showing an example of the operation of the AMF 2. In step 201, the AMF 2 manages a UE context for the UE 1 in the RM-REGISTERED state. The UE context includes an Allowed NSSAI and a Pending NSSAI. As previously described, the UE context may include a Rejected NSSAI.

The UE context may include status information indicating permission status by NSSAA for each of the S-NSSAIs included in one or more of the Allowed NSSAI, Rejected NSSAI, and Pending NSSAI. The status information of the S-NSSAIs may indicate whether the current NSSAA permission for each S-NSSAI is still available (allowed to use, or permitted) or unavailable (not allowed to use, or not permitted) during re-authentication and re-authorization.

In some implementations, the AMF 2 may manage the status information with respect to the S-NSSAIs included in the Allowed NSSAI. In other words, the status information may be associated with the Allowed NSSAI. In other implementations, the AMF 2 may manage the current permission status of each of the S-NSSAIs that are subjected to NSSAA, independently of the Allowed NSSAI, Rejected NSSAI, and Pending NSSAI.

In some implementations, in order to indicate that the current permission by NSSAA for a particular S-NSSAI is still available during re-authentication and re-authorization, the status information may indicate that it is activated (in an activated state), in a valid state, previously authorized, or subject to ongoing (re-)authorization (under (re-)authorization). On the other hand, to indicate that the current permission by NSSAA for a particular S-NSSAI is unavailable during re-authentication and re-authorization, the status information may indicate that it is deactivated (in a deactivated state), in an invalid state, subject to ongoing (re-)authorization (under (re-)authorization), or not (yet) authorized.

That is, if the status information for a particular currently allowed S-NSSAI indicates that (re-)authorization is ongoing, this may mean in some implementations that the current authorization for the particular S-NSSAI is still "valid" during re-authentication and re-authorization, or it may mean in other implementations that the current authorization for the particular S-NSSAI is "invalid" during re-authentication and re-authorization.

Thus, in some implementations, the available state may include multiple states (sub-states), for example, "authorized" and "under re-authentication and re-authorization". In other implementations, the unavailable state may include multiple states (sub-states), for example "unauthorized" and "under re-authentication and re-authorization".

The status information indicating whether the current permission by NSSAA for a particular S-NSSAI is previously authorized, subject to ongoing (re-)authorization (under (re-)authorization), or not (yet) authorized may be included in the data used to manage the operation of the NSSAA with respect to S-NSSAIs. This data may be referred to as "S-NSSAIs subject to Network Slice-Specific Authentication and Authorization".

To indicate that the current permission by NSSAA for a particular S-NSSAI is under (re-)authorization, the status information may indicate that this already authorized S-NSSAI is to be re-authenticated as a precaution.

To indicate that the current permission by NSSAA for a particular S-NSSAI is unauthorized, the status information may indicate that this already authorized S-NSSAI is to be reauthenticated and reauthorized (additionally authenticated and authorized) due to doubt.

As previously described, the AMF 2 may again perform Network Slice-Specific Authentication and Authorization (NSSAA) on one or more currently authorized S-NSSAIs of the UE 1. More specifically, if an AAS server (AAA-S) triggers re-authentication of one or more currently allowed S-NSSAIs, then the AMF 2 triggers the initiation of NSSAA for these S-NSSAIs. In addition, the AMF 2 may determine, based on changes in the UE 1's subscription information, that reauthentication is required for one or more currently allowed S-NSSAIs of the UE 1. Furthermore, when the AMF 2 receives a Registration Request message for Mobility Registration Update or Periodic Registration Update from the UE 1, it may determine, for example based on operator policy, that re-authentication is required for one or more currently allowed S-NSSAIs. In addition, as well as these conditions, the AMF 2 may determine that re-authentication is required for one or more currently allowed S-NSSAIs, for example based on operator policy. In these cases, the AMF 2 triggers the initiation of NSSAA for an S-NSSAI(s) that need to be reauthenticated.

In step 202, when the AMF 2 triggers a re-authentication and re-authorization procedure (a renewed or additional NSSAA) for a particular S-NSSAI currently allowed to the UE 1, it removes that particular S-NSSAI from the Allowed NSSAI and stores it in the Pending NSSAI. In other words, the AMF 2 may change this particular S-NSSAI from the Allowed NSSAI to the Pending NSSAI. The re-authentication and re-authorization procedure is initiated by the AMF 2 for the reasons mentioned above or for other reasons. More specifically, the AMF 2 may send an authentication request message to the AUSF 4 in order to initiate (or trigger the initiation of) the re-authentication and re-authorization procedure. The authentication request message may be, for example, an Nausf_Communication_EAPMessage_Transfer message or an Nausf_NSSAA_Authenticate Request message. The AMF 2 may send the S-NSSAI required to be (re)authenticated to the AUSF 4 in the above message or in a separate message to the AUSF 4. The AMF 2 may send the UE User ID for EAP authentication (EAP ID) for the S-NSSAI that needs to be (re)authenticated to the AUSF 4 in the above message, or in a separate message to the AUSF 4. The AMF 2 may send the Generic Public Subscription Identifier (GPSI) of the UE 1 in the above message to the AUSF 4, or in a separate message to the AUSF 4. The AMF2 may send the address of the AAA-S to the AUSF4 by including it in the above message, or it may send it to the AUSF4 by another message. Prior to this, the AMF 2 may request the UE 1 for the EAP ID for the relevant S-NSSAI.

As described above, the UE context for the UE 1 may include status information indicating the permission status of S-NSSAIs by NSSAA. The status information for S-NSSAIs may indicate whether the current permission by NSSAA for each S-NSSAI is still available (allowed to use, or permitted) or unavailable (not allowed to use, or not permitted) during re-authentication and re-authorization. In this case, in step 202, the AMF 2 may change the status of the particular S-NSSAI from the available state to the unavailable state. Specifically, in step 202, the AMF 2 may move the particular S-NSSAI from the Allowed NSSAI to the Pending NSSAI, and may also change the status of the particular S-NSSAI from the available state to the unavailable state. Alternatively, the AMF 2 may move the particular S-NSSAI from the Allowed NSSAI to the Pending NSSAI, but maintain the status of the particular S-NSSAI in the available state.

Step 202 (i.e., removal of the particular S-NSSAI from the Allowed NSSAI and addition of the particular S-NSSAI to the Pending NSSAI) may take place before or after sending the authentication request message for NSSAA from the AMF 2 to the AUSF 4. For example, the AMF 2 may perform step 202 in response to being requested via the AUSF 4 by the AAA-S that a reauthentication event for the particular S-NSSAI has occurred. The AMF 2 may perform step 202 in response to determining, based on operator policy, that reauthentication for the particular S-NSSAI is required. The AMF 2 may perform step 202 in response to determining, based on a change in operator policy, that reauthentication for the particular S-NSSAI is required. The AMF 2 may perform step 202 in response to determining, based on a change in the subscription information, that re-authentication for the particular S-NSSAI is required. For example, the AMF 2 may perform step 202 in response to sending the authentication request message to the AUSF 4. For example, the AMF 2 may perform step 202 in response to requesting the UE 1 for the EAP ID for the relevant S-NSSAI.

The procedure in FIG. 2 can, for example, contribute to improving security. For example, if the AMF 2 receives a request from the UE 1 to establish a new PDU session associated with the particular S-NSSAI while the re-authentication and re-authorization procedure for the particular S-NSSAI is ongoing, it may reject the received PDU session establishment request or suspend or refrain from the PDU session establishment procedure based on the fact that the particular S-NSSAI is included in the Pending NSSAI.

For example, the AMF 2 may reject the received PDU session establishment request or suspend the PDU session establishment procedure based on the information indicating the status regarding the current permission by the NSSAA for each of the S-NSSAIs. More specifically, when the AMF 2 receives a request from the UE 1 to establish a new PDU session associated with the particular S-NSSAI, it may reject the received PDU session establishment request or suspend the PDU session establishment procedure based on the fact that the status of the particular S-NSSAI is in the unavailable state.

In some implementations, the AAA-S may perform the same actions as in FIG. 2. Specifically, similar to step 201, the AAA-S may store the Allowed NSSAI and Pending NSSAI for the UE 1 and may further store the Rejected NSSAI for the UE 1. As in step 202, the AAA-S may remove that particular S-NSSAI from the Allowed NSSAI and store it in the Pending NSSAI when a re-authentication and re-authorization procedure (a renewed or additional NSSAA) is performed for the particular S-NSSAI currently allowed to the UE 1. Alternatively, the AAA-S may change the particular S-NSSAI from the Allowed NSSAI to the Pending NSSAI. As described with respect to the AMF 2, the AAA-S may further manage the information indicating the status regarding the current permission by NSSAA for each of the S-NSSAIs.

By allowing the AAA-S to manage the authorization status of S-NSSAIs by NSSAA, unnecessary signaling can be reduced. For example, during the execution of a re-authentication and re-authorization procedure for a particular S-NSSAI, the AAA-S can avoid sending signalling for a re-authentication and re-authorization request for that particular S-NSSAI.

Figure 3:
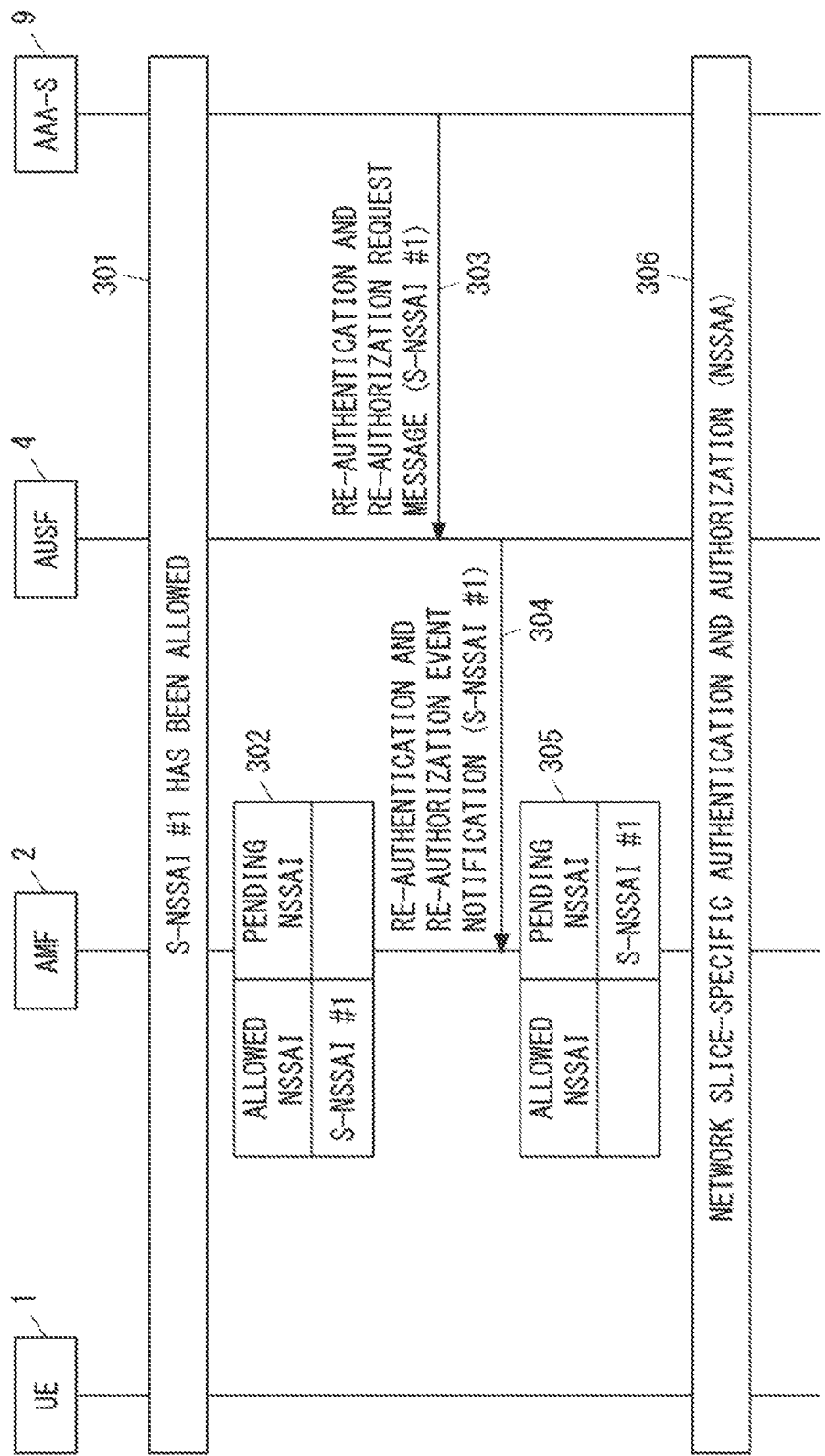
FIG. 3 is a sequence diagram showing an example of operations of a UE, an AMF and an AUSF according to an embodiment.

FIG. 3 shows an example of a re-authentication and re-authorization procedure initiated (or triggered) by the AAA-S. In step 301, a particular S-NSSAI (in this case S-NSSAI #1) has been allowed to the UE 1. Accordingly, S-NSSAI #1 is included in the Allowed NSSAI in the UE context (302) for the UE 1, which is managed by the AMF 2.

In step 303, the AAA-S 9 requests re-authentication and re-authorization for the network slice identified by S-NSSAI #1. Specifically, the AAA-S 9 may send a re-authentication and re-authorization request message to the AUSF 4. This message may be, for example, a Nausf_Re-Auth Request message or an AAA Protocol Re-Auth Request message. The message indicates S-NSSAI #1 and further indicates the Generic Public Subscription Identifier (GPSI) of the UE 1. The message may be sent directly from the AAA-S 9 to the AUSF 4, or may be sent to the AUSF 4 via an AAA Proxy (AAA-P) not illustrated.

In step 304, the AUSF 4 notifies the AMF 2 that an event of re-authentication and re-authorization of S-NSSAI #1 for the UE 1 has occurred via an NF service provided by the AUSF 4. The notification may be, for example, a Namf_Re-Auth Request message or a NAusf_NSSAA_Notify message. The notification indicates S-NSSAI #1 and further indicates the GPSI of the UE 1.

In step 305, the AMF 2 removes S-NSSAI #1 from the Allowed NSSAI in the UE context for the UE 1 and stores (or adds)S-NSSAI #1 to the Pending NSSAI in the UE context for the UE 1. In other words, the AMF 2 may move (or change)S-NSSAI #1 from the Allowed NSSAI to the Pending NSSAI.

As described above, the UE context for the UE 1 may include status information indicating permission status of S-NSSAIs by NSSAA. The status information for S-NSSAIs may indicate whether the current permission by the NSSAA for each S-NSSAI is still available (allowed to use, or permitted) or unavailable (not allowed to use, or not permitted) during re-authentication and re-authorization. In this case, in step 305, the AMF 2 may change the status of S-NSSAI #1 from the available state to the unavailable state. More specifically, the AMF 2 may move S-NSSAI #1 from the Allowed NSSAI to the Pending NSSAI, and may also change the status of S-NSSAI #1 from the available state to the unavailable state. Alternatively, in step 305, the AMF 2 may move S-NSSAI #1 from the Allowed NSSAI to the Pending NSSAI, but maintain the status of S-NSSAI #1 in the available state.

In step 306, the AMF 2 triggers a Network Slice-Specific Authentication and Authorization (NSSAA) procedure, which is similar to the existing one. The existing NSSAA procedure is specified in section 4.2.9.1 of Non-Patent Literature 2.

The procedure of FIG. 3 may be modified as appropriate. For example, step 305 may take place after step 306 has been initiated (i.e., during the execution of the NSSAA procedure).

Second Embodiment

Figure 4:
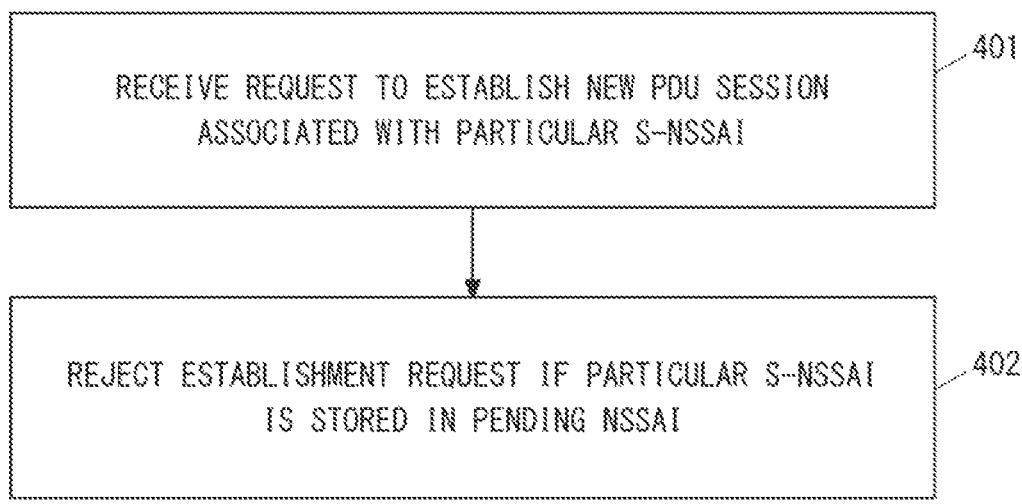
FIG. 4 is a flowchart showing an example of operation of an AMF according to an embodiment.

This embodiment provides a modification of the first embodiment. A configuration example of a cellular network according to this embodiment may be the same as the example shown in FIG. 1. FIG. 4 is a flowchart showing an example of the operation of the AMF 2. The operation described in FIG. 4 takes place, for example, after step 202 of FIG. 2. In step 401, the AMF 2 receives a request from the UE 1 to establish a new PDU session associated with a particular S-NSSAI. More specifically, the AMF 2 receives a NAS message (e.g., UL NAS Transport message) from the UE 1. The NAS message contains the particular S-NSSAI, a new PDU session ID, and an N1 SM container (PDU Session Establishment Request). For example, the AMF 2 may determine the receipt of a new PDU session establishment request associated with the particular S-NSSAI based on the fact that the NAS message received in step 401 contains the particular S-NSSAI and a new PDU session ID.

In step 402, the AMF 2 checks the UE context for the UE 1. The AMF 2 then rejects the received establishment request if that particular S-NSSAI is stored in the Pending NSSAI.

As described above, the UE context for the UE 1 may include status information indicating permission status of S-NSSAIs by NSSAA. The status information for S-NSSAIs may indicate whether the current permission by the NSSAA for each S-NSSAI is still available (allowed to use, or permitted) or unavailable (not allowed to use, or not permitted) during re-authentication and re-authorization. In this case, in step 402, the AMF 2 may reject the received establishment request if the status of the particular S-NSSAI is in the unavailable state. Alternatively, in step 402, the AMF 2 may reject the received establishment request if the particular S-NSSAI is stored in the Pending NSSAI and the status of the particular S-NSSAI is in the unavailable state.

The operation shown in FIG. 4 allows the AMF 2 to prevent the establishment of a new PDU session associated with the network slice for which the re-authentication and re-authorization procedure is ongoing.

Third Embodiment

This embodiment provides a modification of the first embodiment. A configuration example of a cellular network according to this embodiment may be the same as the example shown in FIG. 1.

Figure 5:
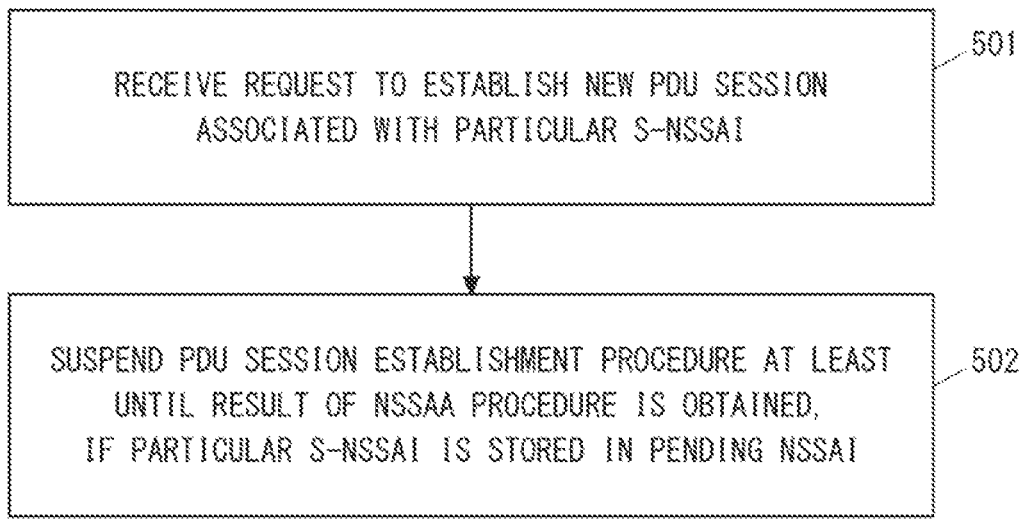
FIG. 5 is a flowchart showing an example of operation of an AMF according to an embodiment.

FIG. 5 is a flowchart showing an example of the operation of the AMF 2. The operation described in FIG. 5 takes place, for example, after step 202 of FIG. 2. In step 501, the AMF 2 receives a request from the UE 1 to establish a new PDU session associated with a particular S-NSSAI. More specifically, the AMF 2 receives a NAS message (e.g., UL NAS Transport message) from the UE 1. The NAS message contains the particular S-NSSAI, a new PDU session ID, and an N1 SM container (PDU Session Establishment Request). For example, the AMF 2 may determine the receipt of a new PDU session establishment request associated with the particular S-NSSAI based on the fact that the NAS message received in step 501 contains the particular S-NSSAI and a new PDU session ID.

In step 502, the AMF 2 checks the UE context for the UE 1. The AMF 2 then suspends or refrains from the PDU session establishment procedure if that particular S-NSSAI is stored in the Pending NSSAI. The AMF 2 may suspend the PDU session establishment procedure at least until the result of the NSSAA procedure is obtained. Alternatively, the AMF 2 may suspend the PDU session establishment procedure until a predetermined period of time has elapsed. Alternatively, the AMF 2 may suspend the PDU session establishment procedure until it receives again a request from the UE 1 to establish a new PDU session associated with the particular S-NSSAI. The AMF 2 may resume the suspended PDU session establishment procedure if the NSSAA procedure is successful.

The operation shown in FIG. 5 allows the AMF 2 to prevent the establishment of a new PDU session associated with the network slice for which the re-authentication and re-authorization procedure is ongoing.

As described above, the UE context for the UE 1 may include status information indicating permission status of S-NSSAIs by NSSAA. The status information for S-NSSAIs may indicate whether the current permission by the NSSAA for each S-NSSAI is still available (allowed to use, or permitted) or unavailable (not allowed to use, or not permitted) during re-authentication and re-authorization. In this case, in step 502, the AMF 2 may suspend the PDU session establishment procedure if the status of the particular S-NSSAI is in the unavailable state. Alternatively, in step 502, the AMF 2 may suspend the PDU session establishment procedure when the particular S-NSSAI is stored in the Pending NSSAI and the status of the particular S-NSSAI is in the unavailable state. This allows the AMF 2 to control the establishment of a PDU session associated with a particular S-NSSAI based on whether or not the current permission by NSSAA for the particular S-NSSAI is still available during re-authentication and re-authorization.

Fourth Embodiment

This embodiment provides a modification of the first embodiment. A configuration example of a cellular network according to this embodiment may be the same as the example shown in FIG. 1.

Figure 6:
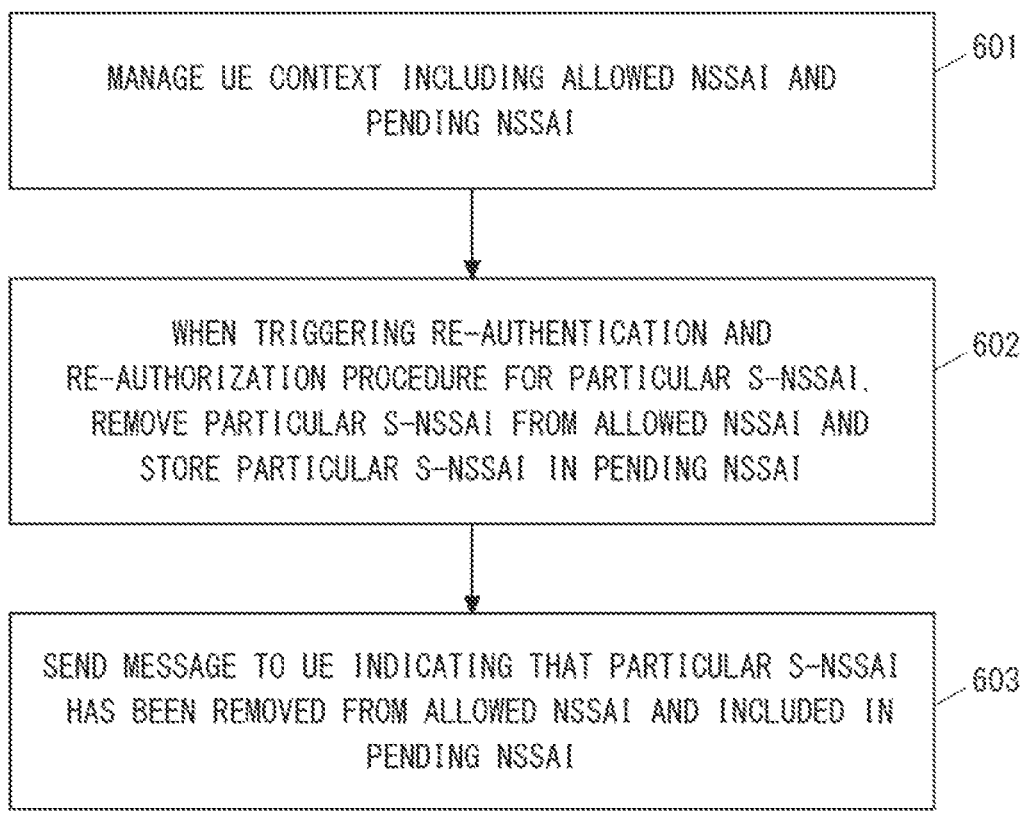
FIG. 6 is a flowchart showing an example of operation of an AMF according to an embodiment.

FIG. 6 is a flowchart showing an example of the operation of the AMF 2. Steps 601 and 602 in FIG. 6 are similar to steps 201 and 202 in FIG. 2. In step 603, the AMF 2 sends a message to the UE 1 indicating that a particular S-NSSAI is to be removed from the Allowed NSSAI and included in the Pending NSSAI. This message may be a message sent by the AMF 2 to the UE 1 to update the UE NSSAI configuration or any other UE configuration. This message may be a NAS message, or more specifically a UE Configuration Update Command message. In response to receiving the message, the UE 1 updates the UE NSSAI configuration (NSSAI storage) stored in a (non-volatile) memory of the UE 1. Specifically, the UE 1 removes the particular S-NSSAI from the Allowed NSSAI in the UE NSSAI configuration (NSSAI storage) and stores it in the Pending NSSAI.

The operation shown in FIG. 6 allows the AMF 2 to control the UE 1 to synchronize the UE NSSAI settings (NSSAI storage) in the UE 1 with the UE context in the AMF 2.

Fifth Embodiment

A configuration example of a cellular network according to this embodiment may be the same as the example shown in FIG. 1. This embodiment provides another example of the management of UE context (Allowed NSSAI and Pending NSSAI) by the AMF 2.

Figure 7:
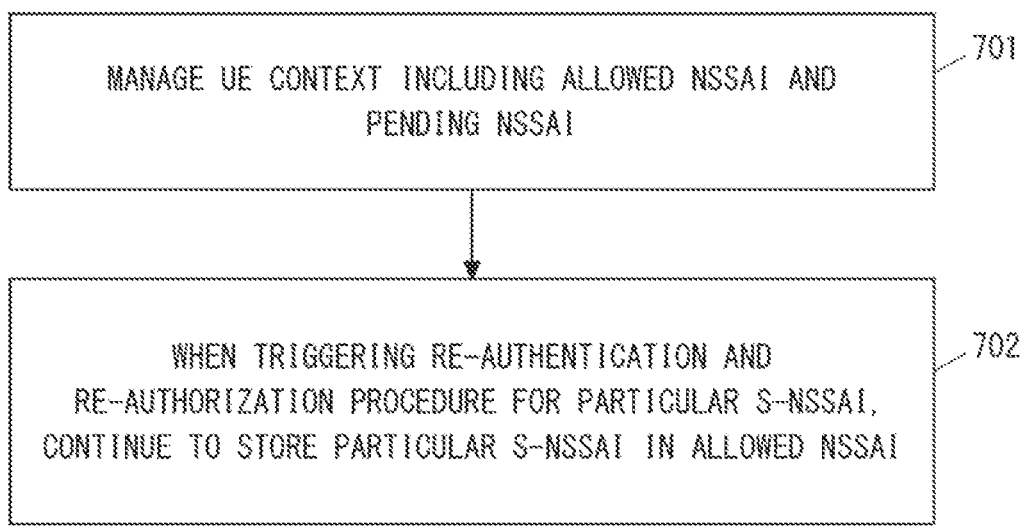
FIG. 7 is a flowchart showing an example of operation of an AMF according to an embodiment.

FIG. 7 is a flowchart showing an example of the operation of the AMF 2. Step 701 is similar to step 201 in FIG. 2. Specifically, in step 701, the AMF 2 manages the UE context for the UE 1 in the RM-REGISTERED state. The UE context includes an Allowed NSSAI and a Pending NSSAI. As previously described, the UE context may also include a Rejected NSSAI.

As described in the first embodiment, the UE context may include status information indicating permission status by NSSAA for each of the S-NSSAIs included in one or more of the Allowed NSSAI, Rejected NSSAI, and Pending NSSAI. The status information for the S-NSSAIs may indicate whether the current NSSAA permission for each S-NSSAI is still available (allowed to use, or permitted) or unavailable (not allowed to use, or not permitted) during re-authentication and re-authorization.

In some implementations, the AMF 2 may manage the status information with respect to the S-NSSAIs included in the Allowed NSSAI. In other words, the status information may be associated with the Allowed NSSAI. In other implementations, the AMF 2 may manage the current permission status of each of the S-NSSAIs that are subjected to NSSAA, independently of the Allowed NSSAI, Rejected NSSAI, and Pending NSSAI.

In some implementations, in order to indicate that the current permission by NSSAA for a particular S-NSSAI is still available during re-authentication and re-authorization, the status information may indicate that it is activated (in an activated state), in a valid state, or previously authorized. On the other hand, to indicate that the current permission by NSSAA for a particular S-NSSAI is unavailable due to re-authentication and re-authorization in progress, the status information may indicate that it is deactivated (in a deactivated state), in an invalid state, subject to ongoing (re-) authorization (under (re-) authorization), or not (yet) authorized.

That is, if the status information for a particular currently allowed S-NSSAI indicates that (re-)authorization is ongoing, this may mean in some implementations that the current authorization for the particular S-NSSAI is still "valid" during re-authentication and re-authorization, or it may mean in other implementations that the current authorization for the particular S-NSSAI is "invalid" during re-authentication and re-authorization.

The available state may include multiple states (sub-states), for example, "authorized" and "under re-authentication and re-authorization". Similarly, the unavailable state may include multiple states (sub-states), for example, "unauthorized" and "under re-authentication and re-authorization".

The status information indicating whether the current permission by NSSAA for a particular S-NSSAI is previously authorized, under (re-)authorization, or not (yet) authorized may be included in the data used to manage the operation of the NSSAA with respect to S-NSSAIs. This data may be referred to as "S-NSSAIs subject to Network Slice-Specific Authentication and Authorization".

To indicate that the current permission by NSSAA for a particular S-NSSAI is under (re-)authorization, the status information may indicate that this already authorized S-NSSAI is to be re-authenticated as a precaution.

To indicate that the current permission by NSSAA for a particular S-NSSAI is unauthorized, the status information may indicate that this already authorized S-NSSAI is to be reauthenticated and reauthorized (additionally authenticated and authorized) due to doubt.

In step 702, when the AMF 2 triggers a re-authentication and re-authorization procedure (a renewed or additional NSSAA) for a particular S-NSSAI currently allowed to the UE 1, it continues to store the particular S-NSSAI in the Allowed NSSAI. More specifically, the AMF 2 keeps the particular S-NSSAI in the Allowed NSSAI, at least until the result of the re-authentication and re-authorization procedure is obtained.

As described above, the UE context for the UE 1 may include status information indicating permission status of S-NSSAIs by NSSAA. The status information for S-NSSAIs may indicate whether the current permission by the NSSAA for each S-NSSAI is still available (allowed to use, or permitted) or unavailable (not allowed to use, or not permitted) during re-authentication and re-authorization. In this case, in step 702, the AMF 2 may change (or associate) the status of the particular S-NSSAI to the available state. Alternatively, the AMF 2 may maintain the status of the particular S-NSSAI in the available state. In other words, the AMF 2 may recognize that the status of the particular S-NSSAI is in the available state. As previously described, the available state may indicate that the particular S-NSSAI or the permission by NSSAA for it is activated (in an activated state), in a valid state, previously authorized, or subject to ongoing (re-)authorization (under (re-)authorization).

Alternatively, in step 702, the AMF 2 may change (or associate) the status of the particular S-NSSAI to the unavailable state, while keeping the particular S-NSSAI stored in the Allowed NSSAI. In other words, the AMF 2 may recognize that the status of the particular S-NSSAI is in the unavailable state. As previously described, the unavailable state may indicate that the particular S-NSSAI or the permission by NSSAA for it is deactivated (in a deactivated state), in an invalid state, subject to ongoing (re-)authorization (under (re-) authorization), or not yet authorized.

If the re-authentication and re-authorization procedure for the particular S-NSSAI is successful, the AMF 2 may change the status of the particular S-NSSAI from the unavailable state to the available state. In other words, if the re-authentication and re-authorization procedure for the particular S-NSSAI is successful, the AMF 2 may recognize that the status of the particular S-NSSAI is in the available state. In some implementations, the AMF 2 may remove the information indicating the unavailable state (e.g., flags) from the status information for the particular S-NSSAI.

On the other hand, if the re-authentication and re-authorization procedure for the particular S-NSSAI fails, the AMF 2 removes the particular S-NSSAI from the Allowed NSSAI and stores it in the Rejected NSSAI. The AMF 2 sends a message to the UE 1 indicating that the particular S-NSSAI is to be removed from the Allowed NSSAI and included in the Rejected NSSAI. This message may be a message sent from the AMF 2 to the UE 1 to update the UE NSSAI configuration or any other UE configuration. The message may be a NAS message, or more specifically a UE Configuration Update Command message.

The procedure in FIG. 7 can, for example, contribute to the improvement of service continuity. For example, if the AMF 2 receives a request from the UE 1 to establish a new PDU session associated with a particular S-NSSAI during the execution of the re-authentication and re-authorization procedure for this particular S-NSSAI, the AMF 2 may proceed with the PDU session establishment procedure on the grounds that this particular S-NSSAI is included in the Allowed NSSAI.

For example, the AMF 2 may determine whether or not to proceed with the PDU session establishment procedure associated with a particular S-NSSAI based on the information indicating the status regarding the current permission by NSSAA for the particular S-NSSAI. For example, if the AMF 2 receives a request from the UE 1 to establish a new PDU session associated with a particular S-NSSAI, it may continue the PDU session establishment procedure based on the fact that the status of that particular S-NSSAI is in the available state.

On the other hand, if the AMF 2 receives a request from the UE 1 to establish a new PDU session associated with a particular S-NSSAI, it may not proceed with the PDU session establishment procedure on the grounds that the status of that particular S-NSSAI is in the unavailable state (e.g., unauthorized).

In some implementations, the AAA-S 9 may perform similar actions as in FIG. 7. Specifically, as in step 701, the AAA-S may store the Allowed NSSAI and Pending NSSAI of the UE 1 and may further store the Rejected NSSAI of the UE 1. Similarly to step 702, when the AAA-S 9 triggers a re-authentication and re-authorization procedure (a renewed or additional NSSAA) for a particular S-NSSAI currently allowed to the UE 1, it may keep that particular S-NSSAI stored in the Allowed NSSAI. In addition, as described for the AMF 2, the AAA-S may manage information indicating the status regarding the current permission by NSSAA for each of the S-NSSAIs.

By allowing the AAA-S 9 to manage the authorization status of S-NSSAIs by NSSAA, unnecessary signaling can be reduced. For example, during the execution of a re-authentication and re-authorization procedure for a particular S-NSSAI, the AAA-S 9 can avoid sending signalling for a re-authentication and re-authorization request for that particular S-NSSAI.

Figure 8:
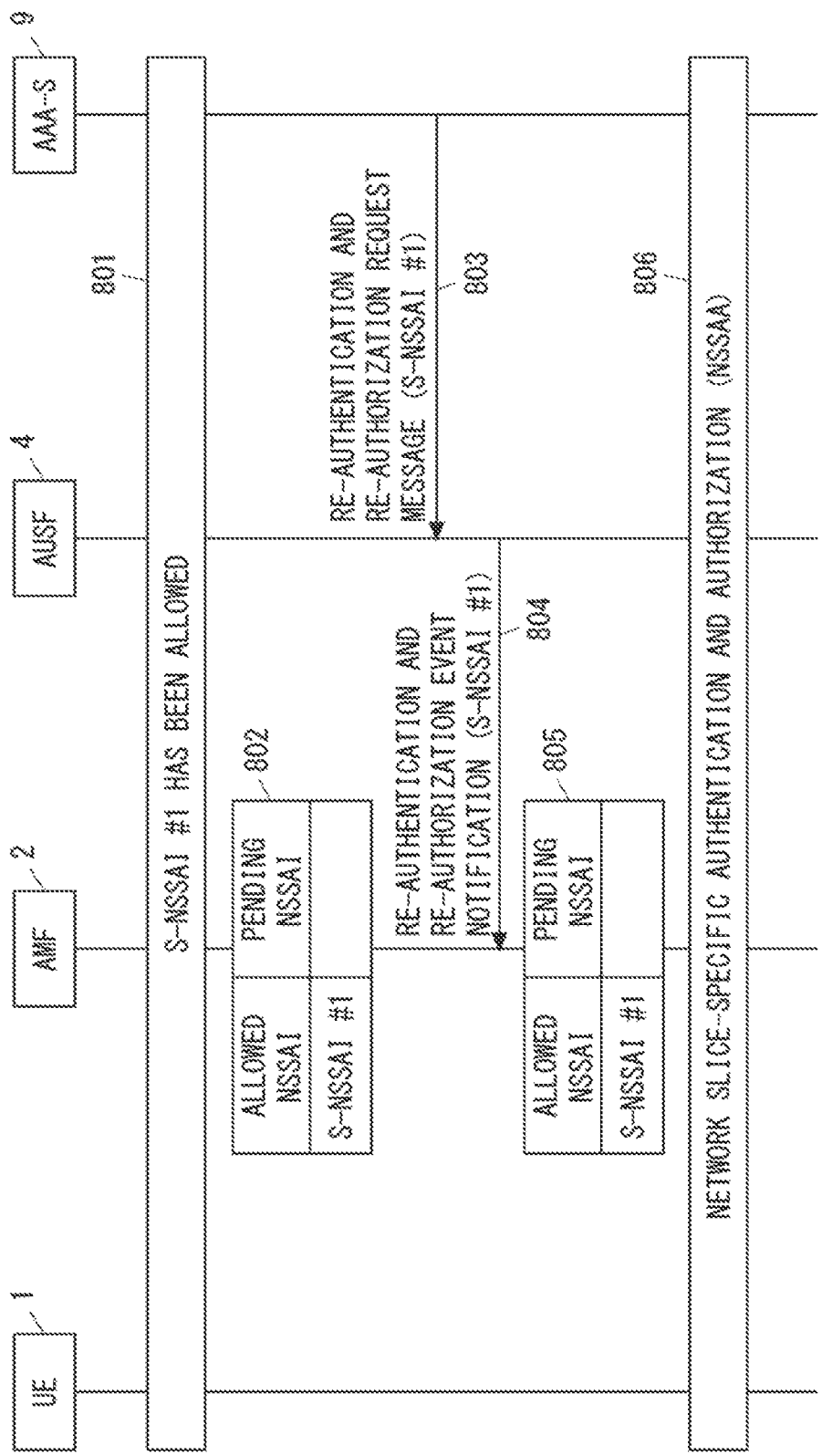
FIG. 8 is a sequence diagram showing an example of operations of a UE, an AMF and an AUSF according to an embodiment.

FIG. 8 shows an example of a re-authentication and re-authorization procedure initiated (or triggered) by the AAA-S. Steps 801-804 in FIG. 8 are similar to steps 301-304 in FIG. 3. In step 805, the AMF 2 maintains S-NSSAI #1 stored in the Allowed NSSAI in the UE context for the UE 1. At this time, the AMF 2 may change (or associate) the status of S-NSSAI#1 to the unavailable state, while keeping S-NSSAI#1 stored in the Allowed NSSAI. In other words, the AMF 2 may recognize that the status of S-NSSAI#1 is in the unavailable state. Step 806 is similar to step 306 in FIG. 3.

Sixth Embodiment

This embodiment provides a modification of the first and fifth embodiments. A configuration example of a cellular network according to this embodiment may be the same as the example shown in FIG. 1.

Figure 9:
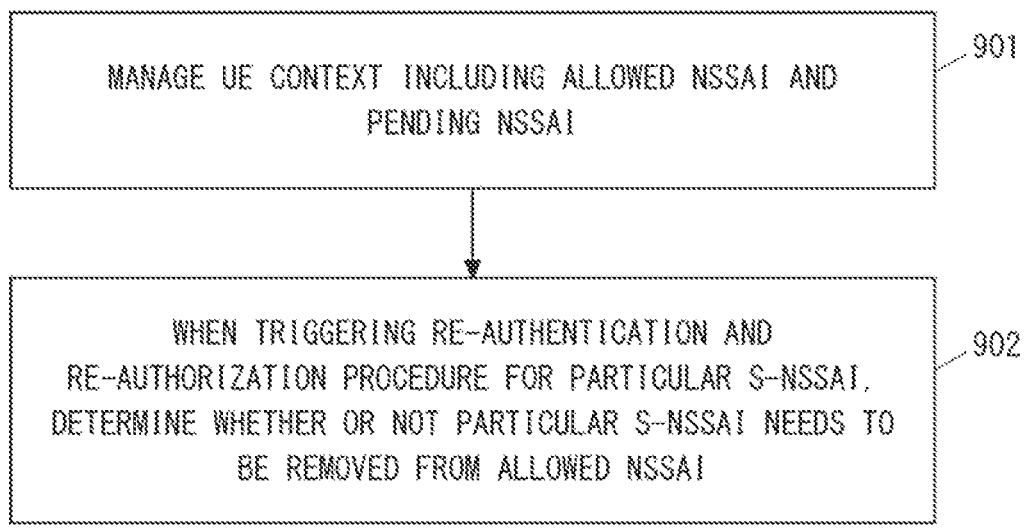
FIG. 9 is a flowchart showing an example of operation of an AMF according to an embodiment.

FIG. 9 is a flowchart showing an example of the operation of the AMF 2. Step 901 is similar to step 201 in FIG. 2 and step 701 in FIG. 7. Specifically, in step 901, the AMF 2 manages a UE context for the UE 1 that is in the RM-REGISTERED state. The UE context includes an Allowed NSSAI and a Pending NSSAI. As previously described, the UE context may also include a Rejected NSSAI.

In step 902, the AMF 2 determines whether to remove the particular S-NSSAI from the Allowed NSSAI when triggering a re-authentication and re-authorization procedure (renewed or additional NSSAA) for the particular S-NSSAI currently allowed to the UE 1. In other words, the AMF 2 determines whether or not the particular S-NSSAI needs to be removed from the Allowed NSSAI. If the particular S-NSSAI needs to be removed from the Allowed NSSAI, the AMF 2 operates in the same way as in step 202 of FIG. 2 to remove the particular S-NSSAI from the Allowed NSSAI and store it in the Pending NSSAI. Otherwise, the AMF 2 operates as in step 702 of FIG. 7 to keep the particular S-NSSAI stored in the Allowed NSSAI.

As described in the first and fifth embodiments, the UE context may include status information indicating permission status by NSSAA for each of the S-NSSAIs included in one or more of the Allowed NSSAI, Rejected NSSAI, and Pending NSSAI. The status information for the S-NSSAIs may indicate whether the current NSSAA permission for each S-NSSAI is still available (allowed to use, or permitted) or unavailable (not allowed to use, or not permitted) during re-authentication and re-authorization. When removing the particular S-NSSAI from the Allowed NSSAI in step 902, the AMF 2 may move the particular S-NSSAI from the Allowed NSSAI to the Pending NSSAI and also change the status of the particular S-NSSAI from the available state to the unavailable state. Alternatively, the AMF 2 may move the particular S-NSSAI from the Allowed NSSAI to the Pending NSSAI, but maintain the status of the particular S-NSSAI in the Available state. On the other hand, when maintaining the particular S-NSSAI stored in the Allowed NSSAI, the AMF 2 may change (or associate) the status of the particular S-NSSAI to the available status. Alternatively, the AMF 2 may change (or associate) the status of the particular S-NSSAI to the unavailable state, while continuing to store the particular S-NSSAI in the Allowed NSSAI.

In some implementations, the AMF 2 may make the determination of step 902 on a per-network slice basis (per S-NSSAI). Alternatively, the AMF 2 may make the decision of step 902 on a per-UE basis.

In some implementations, the AMF 2 may make the determination of step 902 based on the subscription information of the UE 1. For example, the subscription information of the UE 1 may indicate the handling of the allowed S-NSSAI (e.g., the need (or not) to maintain the allowed S-NSSAI within the Allowed NSSAI) during network slice reauthentication and reauthorization.

In some implementations, the AMF 2 may make the determination in step 902 based on an indication (or explicit parameter) from the AAA-S that has permitted the particular S-NSSAI. For example, the AAA-S may send a reauthentication request message containing the explicit parameter when requesting the AMF 2 via the AUSF 4 to reauthenticate the network slice associated with the particular S-NSSAI.

In some implementations, the AMF 2 may make the determination in step 902 based on a local configuration of the AMF 2. For example, a network operator may configure the AMF 2 locally with the handling of the allowed S-NSSAI (e.g., the need (or not) to maintain the allowed S-NSSAI within the Allowed NSSAI) during network slice reauthentication and reauthorization.

In some implementations, the AMF 2 may make the determination of step 902 based on the type of network slice associated with the particular S-NSSAI. For example, the AMF 2 may recognize the type of network slice based on the Slice/Service type (SST) or Slice Differentiator (SD) or both included in the particular S-NSSAI. For example, if the particular S-NSSAI indicates a slice type for which service continuity is required (e.g., URLLC), then the AMF 2 may operate as in step 702 of FIG. 7 to keep the particular S-NSSAI stored in the Allowed NSSAI. Otherwise, the AMF 2 may operate as in step 202 of FIG. 2 to remove the particular S-NSSAI from the Allowed NSSAI and store it in the Pending NSSAI.

The operation shown in FIG. 9 allows the AMF 2 to change whether or not to keep the allowed S-NSSAI within the Allowed NSSAI when performing network slice reauthentication and reauthorization.

Seventh Embodiment

This embodiment provides a modification of the fifth embodiments. A configuration example of a cellular network according to this embodiment may be the same as the example shown in FIG. 1. The UE context for the UE 1 in this embodiment contains information indicating the status of S-NSSAIs.

Figure 10:
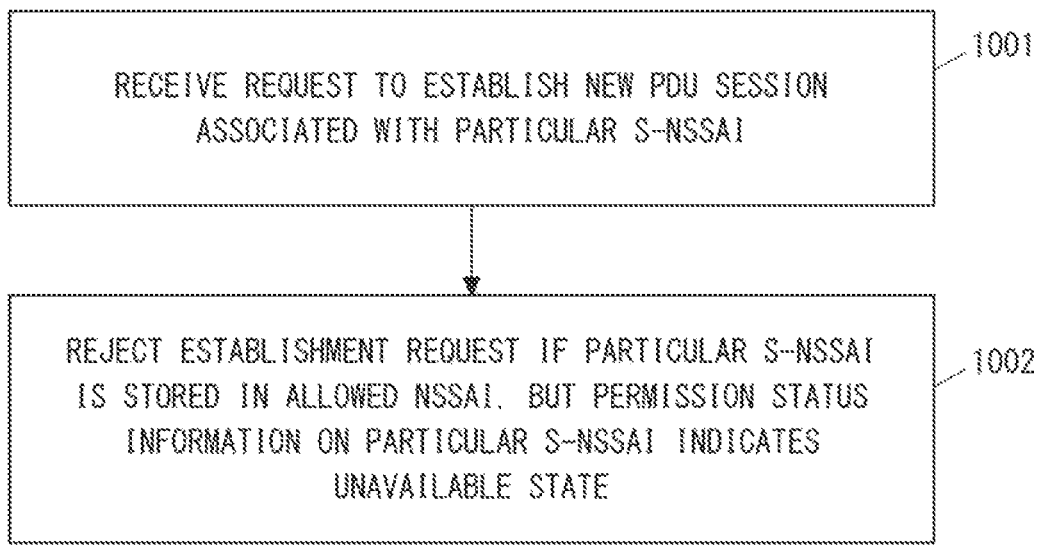
FIG. 10 is a flowchart showing an example of operation of an AMF according to an embodiment.

FIG. 10 is a flowchart showing an example of the operation of the AMF 2. The operation described in FIG. 10 takes place, for example, after step 702 of FIG. 7. In step 1001, the AMF 2 receives a request from the UE 1 to establish a new PDU session associated with a particular S-NSSAI. In step 1002, the AMF 2 refers to the UE context for the UE 1. The AMF 2 then rejects the received establishment request if the particular S-NSSAI is stored in the Allowed NSSAI, but the permission status information on the particular S-NSSAI indicates the unavailable state. As previously described, the unavailable state may be referred to as a not permitted state, not permitted state, deactivate state, or invalid state. As previously described, the unavailable state may be referred to as a not permitted state, deactivate state, or invalid state. The unavailable state may include multiple (sub)states, e.g., "unauthorized" and "under re-authentication and re-authorization".

The operation shown in FIG. 10 allows the AMF 2 to prevent the establishment of a new PDU session associated with a network slice for which the re-authentication and re-authorization procedure is progress.

Eighth Embodiment

This embodiment provides a modification of the fifth embodiments. A configuration example of a cellular network according to this embodiment may be the same as the example shown in FIG. 1. The UE context for the UE 1 in this embodiment contains information indicating the status of S-NSSAIs.

Figure 11:
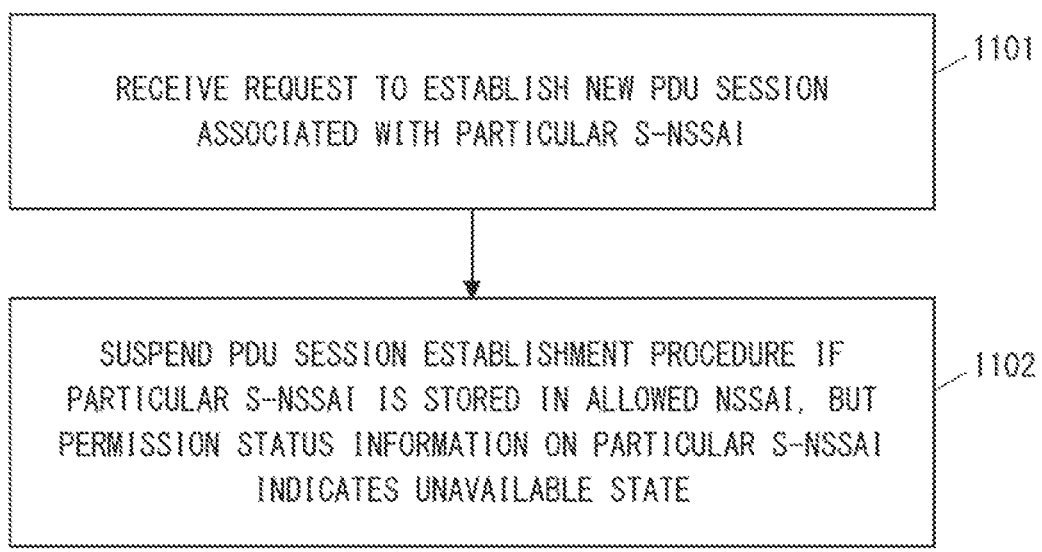
FIG. 11 is a flowchart showing an example of operation of an AMF according to an embodiment.

FIG. 11 is a flowchart showing an example of the operation of the AMF 2. The operation described in FIG. 11 is performed, for example, after step 702 of FIG. 7. In step 1101, the AMF 2 receives a request from the UE 1 to establish a new PDU session associated with a particular S-NSSAI. In step 1102, the AMF 2 checks the UE context for UE 1. If the particular S-NSSAI is stored in the Allowed NSSAI, but the permission status information on the particular S-NSSAI indicates the unavailable state, then the AMF 2 suspends or refrains from the PDU session establishment procedure at least until the result of the NSSAA procedure is obtained. As previously described, the unavailable state may be referred to as a not permitted state, not permitted state, deactivate state, or invalid state. The unavailable state may include several (sub)states, e.g. "unauthorized" and "under re-authentication and re-authorization". The AMF 2 may resume the suspended PDU session establishment procedure if the NSSAA procedure is successful.

The operation shown in FIG. 11 allows the AMF 2 to prevent the establishment of a new PDU session associated with a network slice for which the re-authentication and re-authorization procedure is ongoing, at least until the result of the NSSAA procedure is obtained.

Figure 12:
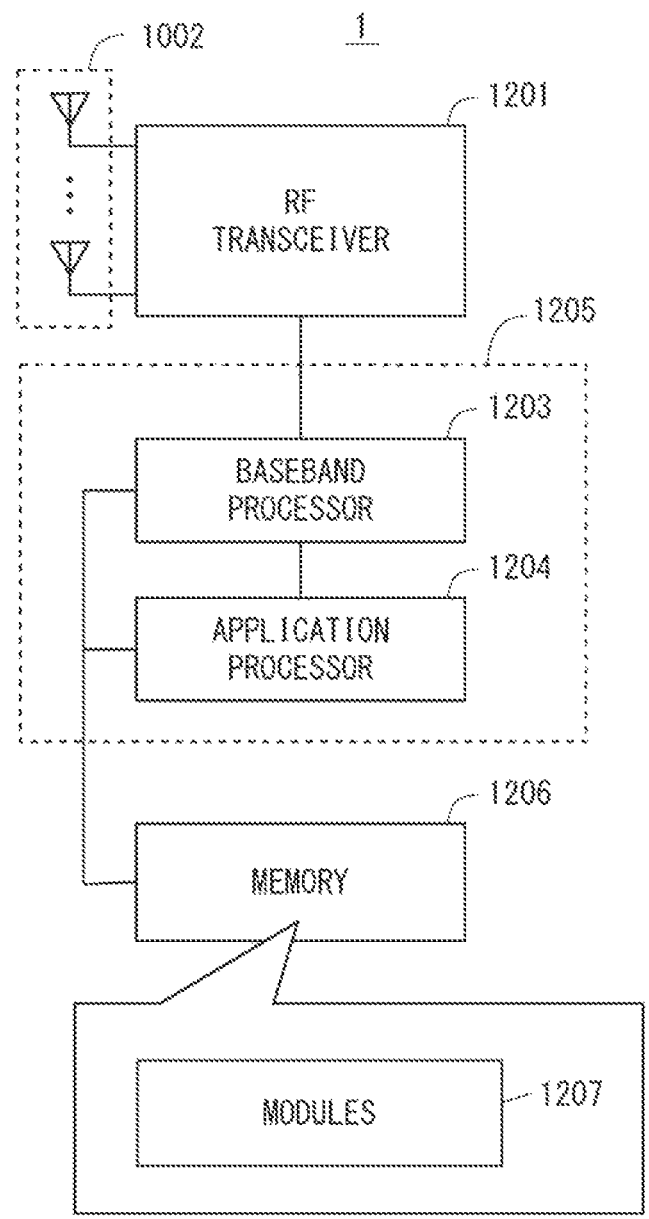
FIG. 12 is a block diagram showing a configuration example of a UE according to an embodiment.

The following provides configuration examples of the UE 1 and AMF 2 according to the above-described embodiments. FIG. 12 is a block diagram showing a configuration example of the UE 1. A Radio Frequency (RF) transceiver 1201 performs analog RF signal processing to communicate with NG-RAN nodes. The RF transceiver 1201 may include a plurality of transceivers. The analog RF signal processing performed by the RF transceiver 1201 includes frequency up-conversion, frequency down-conversion, and amplification. The RF transceiver 1201 is coupled to an antenna array 1202 and a baseband processor 1203. The RF transceiver 1201 receives modulated symbol data (or OFDM symbol data) from the baseband processor 1203, generates a transmission RF signal, and supplies the transmission RF signal to the antenna array 1202. Further, the RF transceiver 1201 generates a baseband reception signal based on a reception RF signal received by the antenna array 1202 and supplies the baseband reception signal to the baseband processor 1203. The RF transceiver 1201 may include an analog beamformer circuit for beam forming. The analog beamformer circuit includes, for example, a plurality of phase shifters and a plurality of power amplifiers.

The baseband processor 1203 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1203 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing performed by the baseband processor 1203 may include processing of Non-Access Stratum (NAS) protocols, Radio Resource Control (RRC) protocols, and MAC Control Elements (CEs).

The baseband processor 1203 may perform Multiple Input Multiple Output (MIMO) encoding and pre-coding for beam forming.

The baseband processor 1203 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1204 described in the following.

The application processor 1204 is also referred to as a CPU, an MPU, a microprocessor, or a processor core. The application processor 1204 may include a plurality of processors (or processor cores). The application processor 1204 loads a system software program (Operating System (OS)) and various application programs (e.g., a call application, a WEB browser, a mailer, a camera operation application, and a music player application) from a memory 1206 or from another memory (not illustrated) and executes these programs, thereby providing various functions of the UE 1.

In some implementations, as represented by a dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. An SoC device may be referred to as a Large-Scale Integration (LSI) or a chipset.

The memory 1206 is a volatile memory, a non-volatile memory, or a combination thereof. The memory 1206 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1206 may include, for example, an external memory device that can be accessed from the baseband processor 1203, the application processor 1204, and the SoC 1205. The memory 1206 may include an internal memory device that is integrated in the baseband processor 1203, the application processor 1204, or the SoC 1205. Further, the memory 1206 may include a memory in a Universal Integrated Circuit Card (UICC).

The memory 1206 may store one or more software modules (computer programs) 1207 including instructions and data to perform the processing by the UE 1 described in the above embodiments. In some implementations, the baseband processor 1203 or the application processor 1204 may load these software modules 1207 from the memory 1206 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 1201 and the antenna array 1202, i.e., achieved by the memory 1206, which stores the software modules 1207, and one or both of the baseband processor 1203 and the application processor 1204.

Figure 13:
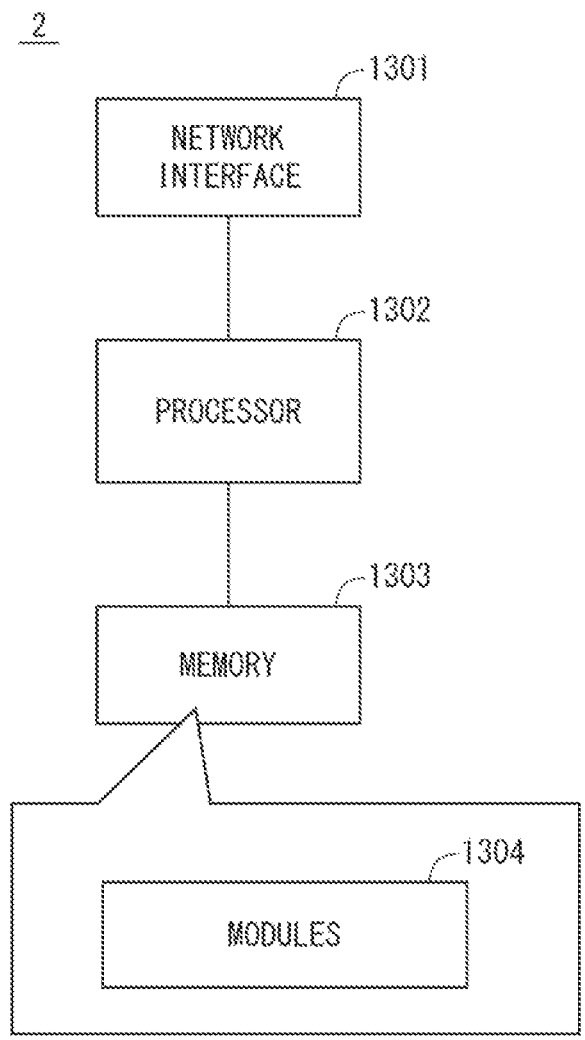
FIG. 13 is a block diagram showing a configuration example of an AMF according to an embodiment.

FIG. 13 shows a configuration example of the AMF 2. Referring to FIG. 13, the AMF 2 includes a network interface 1301, a processor 1302, and a memory 1303. The network interface 1301 is used to communicate, for example, with RAN nodes and with other network functions (NFs) or nodes in the 5GC. The other NFs or nodes in the 5GC include, for example, UDM, AUSF, SMF, and PCF. The network interface 1301 may include, for example, a network interface card (NIC) conforming to the IEEE 802.3 series.

The processor 1302 may be, for example, a microprocessor, a Micro Processing Unit (MPU), or a Central Processing Unit (CPU). The processor 1302 may include a plurality of processors.

The memory 1303 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1303 may include a storage located apart from the processor 1302. In this case, the processor 1302 may access the memory 1303 via the network interface 1301 or an I/O interface (not illustrated).

The memory 1303 may store one or more software modules (computer programs) 1304 including instructions and data to perform the processing of the AMF 2 described in the above embodiments. In some implementations, the processor 1302 may be configured to load the one or more software modules 1304 from the memory 1303 and execute the loaded software modules, thereby performing the processing of the AMF 2 described in the above embodiments.

As described above with reference to FIGS. 12 and 13, each of the processors that the UE 1 and the AMF 2 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; bearings; precision bearings; chains; gears; power transmission equipment; lubricators; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of refrigeration equipment, a refrigeration application product and equipment, trade and/or service industry equipment, a vending machine, an automatic service machine, an office machine or equipment, a consumer electronic and electronic appliance (for example a consumer electronic appliance such as: audio equipment; a speaker; a radio; video equipment; a television; an oven range; a rice cooker; a coffee maker; a dishwasher; a washing machine; dryers, a fan, an exhaust fan and related products, a vacuum cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017-01-13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

An Access and Mobility Management Function (AMF) node comprising:

at least one memory; and at least one processor coupled to the at least one memory,
wherein the at least one processor is configured to manage a User Equipment (UE) context regarding a UE, wherein the UE context includes
a) a set of allowed network slice identifiers indicating one or more network slice identifiers currently allowed to the UE, and
b) a set of pending network slice identifiers indicating one or more network slice identifiers for which a Network Slice-Specific Authentication and Authorization (NSSAA) procedure is pending, and wherein the at least one processor is configured to, in a case where the at least one processor triggers initiation of a re-authentication and re-authorization procedure for a first network slice identifier currently allowed to the UE, remove the first network slice identifier from the set of allowed network slice identifiers, and store the first network slice identifier in the set of pending network slice identifiers.

(Supplementary Note 2)

The AMF node according to Supplementary Note 1, wherein the at least one processor is configured to, in response to receiving a request from the UE to establish a new session associated with the first network slice identifier while the first network slice identifier is stored in the set of pending network slice identifiers, reject the request.

(Supplementary Note 3)

The AMF node according to Supplementary Note 1, wherein the at least one processor is configured to, in response to receiving a request from the UE to establish a new session associated with the first network slice identifier while the first network slice identifier is stored in the set of pending network slice identifiers, suspend a session establishment procedure triggered by the request until at least a result of the re-authentication and re-authorization is obtained.

(Supplementary Note 4)

The AMF node according to any one of Supplementary Notes 1 to 3, wherein the at least one processor is configured to send to the UE a Non-Access Stratum (NAS) message for instructing an update of a UE configuration, in response to removing the first network slice identifier from the set of allowed network slice identifiers and storing the first network slice identifier in the set of pending network slice identifiers, and wherein the NAS message indicates that the first network slice identifier is to be removed from the set of allowed network slice identifiers and included in the set of pending network slice identifiers.

(Supplementary Note 5)

The AMF node according to any one of Supplementary Notes 1 to 4, wherein the at least one processor is configured to:

determine whether the first network slice identifier needs to be removed from the set of allowed network slice identifiers when triggering the initiation of the re-authentication and re-authorization procedure for the first network slice identifier; and continue to store the first network slice identifier in the set of allowed network slice identifiers if the at least one processor determines that the first network slice identifier does not need to be removed from the set of allowed network slice identifiers.

(Supplementary Note 6)

The AMF node according to Supplementary Note 5, wherein the at least one processor is configured to determine, based on subscription information of the UE, whether the first network slice identifier needs to be removed from the set of allowed network slice identifiers when triggering the initiation of the re-authentication and re-authorization procedure for the first network slice identifier.

(Supplementary Note 7)

The AMF node according to Supplementary Note 5, wherein the at least one processor is configured to determine, based on an indication from an Authentication, Authorization and Accounting (AAA) server that allowed the first network slice identifier, whether the first network slice identifier needs to be removed from the set of allowed network slice identifiers when triggering the initiation of the re-authentication and re-authorization procedure for the first network slice identifier.

(Supplementary Note 8)

The AMF node according to Supplementary Note 5, wherein the at least one processor is configured to determine, based on a type of network slice associated with the first network slice identifier, whether the first network slice identifier needs to be removed from the set of allowed network slice identifiers when triggering the initiation of the re-authentication and re-authorization procedure for the first network slice identifier.

(Supplementary Note 9)

The AMF node according to any one of Supplementary Notes 1 to 8, wherein the at least one processor is configured to trigger the initiation of the re-authentication and re-authorization procedure for the first network slice identifier if a) an Authentication, Authorization and Accounting (AAA) server that allowed the first network slice identifier requests reauthentication, or b) the AMF node determines, based on operator policy or on changes in subscription information of the UE, that reauthentication for the first network slice identifier is required.

(Supplementary Note 10)

The AMF node according to any one of Supplementary Notes 1 to 9, wherein the first network slice identifier is a Single Network Slice Selection Assistance Information (S-NSSAI), the set of allowed network slice identifiers is an Allowed Network Slice Selection Assistance Information (NSSAI) indicating one or more S-NSSAIs currently allowed to the UE, and the set of pending network slice identifiers is a Pending NSSAI indicating one or more S-NSSAIs for which the NSSAA is pending.

(Supplementary Note 11)

A method in an Access and Mobility Management Function (AMF) node, the method comprising:

managing a User Equipment (UE) context regarding a UE, wherein the UE context includes
  a) a set of allowed network slice identifiers indicating at least one network slice identifier currently allowed to the UE, and
  b) a set of pending network slice identifiers indicating at least one network slice identifier for which a Network Slice-Specific Authentication and Authorization (NSSAA) procedure is pending; and in a case where the AMF node triggers initiation of a re-authentication and re-authorization procedure for a first network slice identifier currently allowed to the UE, removing the first network slice identifier from the set of allowed network slice identifiers, and storing the first network slice identifier in the set of pending network slice identifiers.

(Supplementary Note 12)

A program for causing a computer to perform a method in an Access and Mobility Management Function (AMF) node, the method comprising:

managing a User Equipment (UE) context regarding a UE, wherein the UE context includes
  a) a set of allowed network slice identifiers indicating at least one network slice identifier currently allowed to the UE, and
  b) a set of pending network slice identifiers indicating at least one network slice identifier for which a Network Slice-Specific Authentication and Authorization (NSSAA) procedure is pending; and in a case where the AMF node triggers initiation of a re-authentication and re-authorization procedure for a first network slice identifier currently allowed to the UE, removing the first network slice identifier from the set of allowed network slice identifiers, and storing the first network slice identifier in the set of pending network slice identifiers.

(Supplementary Note 13)

An Access and Mobility Management Function (AMF) node comprising:

at least one memory; and at least one processor coupled to the at least one memory, wherein the at least one processor is configured to manage a User Equipment (UE) context regarding a UE, wherein the UE context includes
  a) a set of allowed network slice identifiers indicating one or more network slice identifiers currently allowed to the UE, and
  b) a set of pending network slice identifiers indicating one or more network slice identifiers for which a Network Slice-Specific Authentication and Authorization (NSSAA) procedure is pending, and wherein the at least one processor is configured to, in a case where the at least one processor triggers initiation of a re-authentication and re-authorization procedure for a first network slice identifier currently allowed to the UE, continue to store the first network slice identifier in the set of allowed network slice identifiers.

(Supplementary Note 14)

The AMF node according to Supplementary Note 13, wherein the at least one processor is configured to, when continuing to store the first network slice identifier in the set of allowed network slice identifiers, set a status of the first network slice identifier to a first state indicating that the permission currently being made to the first network slice identifier is not valid.

(Supplementary Note 15)

The AMF node according to Supplementary Note 14, wherein the at least one processor is configured to, in response to receiving a request from the UE to establish a new session associated with the first network slice identifier while the status of the first network slice identifier is in the first state, reject the request.

(Supplementary Note 16)

The AMF node according to Supplementary Note 14, wherein the at least one processor is configured to, in response to receiving a request from the UE to establish a new session associated with the first network slice identifier while the status of the first network slice identifier is in the first state, suspend a session establishment procedure triggered by the request until at least a result of the re-authentication and re-authorization is obtained.

(Supplementary Note 17)

The AMF node according to any one of Supplementary Notes 13 to 16, wherein the at least one processor is configured to remove the first network slice identifier from the set of allowed network slice identifiers in response to a failure of the re-authentication and re-authorization procedure for the first network slice identifier.

(Supplementary Note 18)

The AMF node according to any one of Supplementary Notes 13 to 17, wherein the at least one processor is configured to:

determine whether the first network slice identifier needs to be removed from the set of allowed network slice identifiers when triggering the initiation of the re-authentication and re-authorization procedure for the first network slice identifier; and remove the first network slice identifier from the set of allowed network slice identifiers and store the first network slice identifier in the set of pending network slice identifiers, if the at least one processor determines that the first network slice identifier needs to be removed from the set of allowed network slice identifiers.

(Supplementary Note 19)

The AMF node according to Supplementary Note 18, wherein the at least one processor is configured to determine, based on subscription information of the UE, whether the first network slice identifier needs to be removed from the set of allowed network slice identifiers when triggering the initiation of the re-authentication and re-authorization procedure for the first network slice identifier.

(Supplementary Note 20)

The AMF node according to Supplementary Note 18, wherein the at least one processor is configured to determine, based on an indication from an Authentication, Authorization and Accounting (AAA) server that allowed the first network slice identifier, whether the first network slice identifier needs to be removed from the set of allowed network slice identifiers when triggering the initiation of the re-authentication and re-authorization procedure for the first network slice identifier.

(Supplementary Note 21)

The AMF node according to Supplementary Note 18, wherein the at least one processor is configured to determine, based on a type of network slice associated with the first network slice identifier, whether the first network slice identifier needs to be removed from the set of allowed network slice identifiers when triggering the initiation of the re-authentication and re-authorization procedure for the first network slice identifier.

(Supplementary Note 22)

The AMF node according to any one of Supplementary Notes 13 to 21, wherein the at least one processor is configured to trigger the initiation of the re-authentication and re-authorization procedure for the first network slice identifier if a) an Authentication, Authorization and Accounting (AAA) server that allowed the first network slice identifier requests reauthentication, or b) the AMF node determines, based on operator policy or on changes in subscription information of the UE, that reauthentication for the first network slice identifier is required.

(Supplementary Note 23)

The AMF node according to any one of Supplementary Notes 13 to 22, wherein the first network slice identifier is a Single Network Slice Selection Assistance Information (S-NSSAI), the set of allowed network slice identifiers is an Allowed Network Slice Selection Assistance Information (NSSAI) indicating one or more S-NSSAIs currently allowed to the UE, and the set of pending network slice identifiers is a Pending NSSAI indicating one or more S-NSSAIs for which the NSSAA is pending.

(Supplementary Note 24)

A method in an Access and Mobility Management Function (AMF) node, the method comprising:

managing a User Equipment (UE) context regarding a UE, wherein the UE context includes
 a) a set of allowed network slice identifiers indicating at least one network slice identifier currently allowed to the UE, and
 b) a set of pending network slice identifiers indicating at least one network slice identifier for which a Network Slice-Specific Authentication and Authorization (NSSAA) procedure is pending; and in a case where the AMF node triggers initiation of a re-authentication and re-authorization procedure for a first network slice identifier currently allowed to the UE, continuing to store the first network slice identifier in the set of allowed network slice identifiers.

(Supplementary Note 25)

A program for causing a computer to perform a method in an Access and Mobility Management Function (AMF) node, the method comprising:

managing a User Equipment (UE) context regarding a UE, wherein the UE context includes
 a) a set of allowed network slice identifiers indicating at least one network slice identifier currently allowed to the UE, and
 b) a set of pending network slice identifiers indicating at least one network slice identifier for which a Network Slice-Specific Authentication and Authorization (NSSAA) procedure is pending; and in a case where the AMF node triggers initiation of a re-authentication and re-authorization procedure for a first network slice identifier currently allowed to the UE, continuing to store the first network slice identifier in the set of allowed network slice identifiers.

This application is based upon and claims the benefit of priority from Japanese Patent Application No. 2019-237390, filed on Dec. 26, 2019, the disclosure of which is incorporated herein in its entirety by reference.

REFERENCE SIGNS LIST

1 UE
2 AMF
3 SMF
4 AUSF
5 AN
6 UPF
7 DN
8 UDM
9 AAA-S
1203 Baseband Processor
1204 Application Processor
1206 Memory
1207 Modules
1302 Processor
1303 Memory
1304 Modules

What is claimed is:

1. An Access and Mobility Management Function (AMF) node comprising:

a memory; and at least one processor coupled to the memory, wherein the at least one processor is configured to manage a User Equipment (UE) context regarding a UE, wherein the UE context includes
a) a set of allowed network slice identifiers indicating at least one network slice identifier currently allowed to the UE, and
b) a set of pending network slice identifiers indicating at least one network slice identifier for which a Network Slice-Specific Authentication and Authorization (NSSAA) procedure is pending, and wherein the at least one processor is configured to, in a case where the at least one processor triggers initiation of NSSAA in a re-authentication and re-authorization procedure for a first network slice identifier included in the set of allowed network slice identifiers, continue to store the first network slice identifier in the set of allowed network slice identifiers, and set a status of the first network slice identifier to a first state indicating that the NSSAA procedure for the first network slice identifier is currently ongoing.

2. The AMF node according to claim 1, wherein the at least one processor is configured to, in response to receiving a request from the UE to establish a new session associated with the first network slice identifier while the status of the first network slice identifier is in the first state, reject the request.

3. The AMF node according to claim 1, wherein the at least one processor is configured to, in response to receiving a request from the UE to establish a new session associated with the first network slice identifier while the status of the first network slice identifier is in the first state, suspend a session establishment procedure triggered by the request until at least a result of the re-authentication and re-authorization is obtained.

4. The AMF node according to claim 1, wherein the at least one processor is configured to, in response to receiving a request from the UE to establish a new session associated with the first network slice identifier while the status of the first network slice identifier is in the first state, proceed with a session establishment procedure triggered by the request.

5. The AMF node according to claim 1, wherein the at least one processor is configured to remove the first network slice identifier from the set of allowed network slice identifiers in response to a failure of the re-authentication and re-authorization procedure for the first network slice identifier.

6. The AMF node according to claim 5, wherein the at least one processor is configured to:
store the first network slice identifier in the set of rejected network identifiers from the set of allowed network slice identifiers; and
send, to the UE, information indicating that the first network slice identifier is rejected.

7. The AMF node according to claim 1, wherein the at least one processor is configured to, in response to a success of the re-authentication and re-authorization procedure for the first network slice identifier, change the first state to a second state indicating that the first network slice identifier is allowed to the UE.

8. The AMF node according to claim 7, wherein the at least one processor is configured to, in response to receiving a request from the UE to establish a new session associated with the first network slice identifier while the status of the first network slice identifier is in the second state, proceed with a session establishment procedure triggered by the request.

9. The AMF node according to claim 1, wherein the at least one processor is configured to trigger the initiation of the re-authentication and re-authorization procedure for the first network slice identifier if an Authentication, Authorization and Accounting (AAA) server that allowed the first network slice identifier requests reauthentication, or the AMF node determines, based on operator policy or on changes in subscription information of the UE, that reauthentication for the first network slice identifier is required.

10. The AMF node according to claim 1, wherein
the first network slice identifier is a Single Network Slice Selection Assistance Information (S-NSSAI),
the set of allowed network slice identifiers is an Allowed Network Slice Selection Assistance Information (NSSAI) indicating at least one S-NSSAI currently allowed to the UE, and
the set of pending network slice identifiers is a Pending NSSAI indicating at least one S-NSSAI for which the NSSAA is pending.

11. A method in an Access and Mobility Management Function (AMF) node, the method comprising:
managing a User Equipment (UE) context regarding a UE,
wherein the UE context includes
a) a set of allowed network slice identifiers indicating at least one network slice identifier currently allowed to the UE, and
b) a set of pending network slice identifiers indicating at least one network slice identifier for which a Network Slice-Specific Authentication and Authorization (NSSAA) procedure is pending; and
in a case where the AMF node triggers initiation of NSSAA in a re-authentication and re-authorization procedure for a first network slice identifier included in the set of allowed network slice identifiers, continuing to store the first network slice identifier in the set of allowed network slice identifiers, and setting a status of the first network slice identifier to a first state indicating that the NSSAA procedure for the first network slice identifier is currently ongoing.

12. The method according to claim 11, further comprising, in response to receiving a request from the UE to establish a new session associated with the first network slice identifier while the status of the first network slice identifier is in the first state, rejecting the request.

13. The method according to claim 11, further comprising, in response to receiving a request from the UE to establish a new session associated with the first network slice identifier while the status of the first network slice identifier is in the first state, suspending a session establishment procedure triggered by the request until at least a result of the re-authentication and re-authorization is obtained.

14. The method according to claim 11, further comprising, in response to receiving a request from the UE to establish a new session associated with the first network slice identifier while the status of the first network slice identifier is in the first state, proceeding with a session establishment procedure triggered by the request.

15. The method according to claim 11, further comprising removing the first network slice identifier from the set of allowed network slice identifiers in response to a failure of the re-authentication and re-authorization procedure for the first network slice identifier.

16. The method according to claim 15, further comprising: storing the first network slice identifier in the set of rejected network identifiers from the set of allowed network slice identifiers; and sending, to the UE, information indicating that the first network slice identifier is rejected.

17. The method according to claim 11, further comprising, in response to a success of the re-authentication and re-authorization procedure for the first network slice identifier, changing the first state to a second state indicating that the first network slice identifier is allowed to the UE.

18. The method according to claim 17, further comprising, in response to receiving a request from the UE to establish a new session associated with the first network slice identifier while the status of the first network slice identifier is in the second state, proceeding with a session establishment procedure triggered by the request.

19. The method according to claim 11, further comprising, triggering the initiation of the re-authentication and re-authorization procedure for the first network slice identifier if an Authentication, Authorization and Accounting (AAA) server that allowed the first network slice identifier requests reauthentication, or the AMF node determines, based on operator policy or on changes in subscription information of the UE, that reauthentication for the first network slice identifier is required.

20. The method according to claim 11, wherein
the first network slice identifier is a Single Network Slice Selection Assistance Information (S-NSSAI),
the set of allowed network slice identifiers is an Allowed Network Slice Selection Assistance Information (NSSAI) indicating at least one S-NSSAI currently allowed to the UE, and
the set of pending network slice identifiers is a Pending NSSAI indicating at least one S-NSSAI for which the NSSAA is pending.

* * * * *